US011323169B2

(12) United States Patent
Yang et al.

(10) Patent No.: US 11,323,169 B2
(45) Date of Patent: May 3, 2022

(54) SIMULTANEOUS UPLINK TRANSMISSIONS USING SPATIAL MULTIPLEXING

(71) Applicant: QUALCOMM Incorporated, San Diego, CA (US)

(72) Inventors: Wei Yang, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 16/293,986

(22) Filed: Mar. 6, 2019

(65) Prior Publication Data

US 2019/0280757 A1    Sep. 12, 2019

Related U.S. Application Data

(60) Provisional application No. 62/700,172, filed on Jul. 18, 2018, provisional application No. 62/640,566, filed on Mar. 8, 2018.

(51) Int. Cl.
*H04B 7/06* (2006.01)
*H04L 5/00* (2006.01)
(Continued)

(52) U.S. Cl.
CPC ......... *H04B 7/0697* (2013.01); *H04L 5/0023* (2013.01); *H04L 5/0048* (2013.01);
(Continued)

(58) Field of Classification Search
CPC ... H04B 7/0697; H04L 5/0055; H04L 5/0051; H04L 5/0053; H04L 5/0023; H04L 5/0048; H04W 74/0833; H04W 72/042
(Continued)

(56) References Cited

U.S. PATENT DOCUMENTS

2013/0121280 A1* 5/2013 Ouchi ................. H04L 5/0048
                                                        370/329
2017/0238190 A1   8/2017 Yang et al.
(Continued)

FOREIGN PATENT DOCUMENTS

EP            3346748 A1    7/2018
WO    WO-2017038533 A1    3/2017

OTHER PUBLICATIONS

AT & T: "On Multi-TRP PUCCH Reception," 3GPP Draft; R1-1716167 on Multi-TRP PUCCH Reception, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017, Sep. 17, 2017, XP051339625, 3 pages, Retrieved from the Internet: URL: http://www.3gpp.org/ftp/Meetings_3GPP_SYNC/RAN1/Docs/ [retrieved on Sep. 17, 2017] sections 2 & 3.
(Continued)

*Primary Examiner* — Kwang B Yao
*Assistant Examiner* — Syed M Bokhari
(74) *Attorney, Agent, or Firm* — Holland & Hart LLP/Qualcomm

(57) ABSTRACT

A spatial multiplexing configuration may enable a user equipment (UE) to spatially multiplex two or more uplink channels of different types for simultaneous transmission. For example, a UE may receive an indication of a spatial multiplexing configuration from a base station. The UE may identify two or more uplink channels for simultaneous transmission on a same component carrier, where each uplink channel may be a different type. In such cases, the UE may spatially multiplex the two or more uplink channels on a same set of time/frequency resources on the component carrier in accordance with the spatial multiplexing configuration. The spatially multiplexed uplink channels may then be simultaneously transmitted by the UE on the set of
(Continued)

resources, where the spatially multiplexed uplink channels may be simultaneously sent to the same base station or to different base stations. Additionally, different spatial parameters may be applied to each uplink channel.

28 Claims, 19 Drawing Sheets

(51) Int. Cl.
    *H04W 74/08*     (2009.01)
    *H04W 72/04*     (2009.01)
(52) U.S. Cl.
    CPC .......... *H04L 5/0051* (2013.01); *H04L 5/0053* (2013.01); *H04L 5/0055* (2013.01); *H04W 72/042* (2013.01); *H04W 74/0833* (2013.01)
(58) Field of Classification Search
    USPC ........................................................ 370/329
    See application file for complete search history.

(56) References Cited

U.S. PATENT DOCUMENTS

| | | | | |
|---|---|---|---|---|
| 2017/0317794 A1* | 11/2017 | You | ....................... | H04L 5/0051 |
| 2018/0102817 A1* | 4/2018 | Park | ....................... | H04B 7/04 |
| 2018/0254807 A1* | 9/2018 | Takeda | .................. | H04W 72/04 |
| 2018/0270634 A1* | 9/2018 | Kim | ........................... | H04L 1/08 |
| 2019/0068317 A1* | 2/2019 | Babaei | .................. | H04L 1/1664 |
| 2019/0182812 A1* | 6/2019 | Shimezawa | ......... | H04W 72/044 |
| 2019/0372732 A1* | 12/2019 | Faxer | .................... | H04L 5/0048 |

OTHER PUBLICATIONS

Huawei: "Uplink Transmission Modes and Antenna Ports Definition," 3GPP Draft; R1-103450 Uplink Transmission Modes, 3rd Generation Partnership Project (3GPP), Mobile Competence Centre; 650, Route Des Lucioles; F-06921 Sophia-Antipolis Cedex; France, vol. RAN WG1, No. Dresden, Germany; Jun. 28, 2010, Jun. 22, 2010, XP050448976, 4 pages, [retrieved on Jun. 22, 2010] sections 2 and 3.
International Search Report and Written Opinion—PCT/US2019/021240—ISA/EPO—dated Jun. 11, 2019.
NEC: "Discussion on Multi-TRP Operation," 3GPP Draft; R1-1902688 Discussion on Multi-TRP Operation, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 25, 2019-Mar. 1, 2019, Feb. 15, 2019, XP051600383, 3 pages, Retrieved from the Internet: URL: http://www.3gpp.org/ftp/tsg%5Fran/WG1%5FRL1/TSGR1%5F96/Docs/R1%2D1902688%2Ezip [retrieved on Feb. 15, 2019] section 2.
Zte et al: "Summary of Remaining Issues on UL Power Control," 3GPP Draft; R1-1721372 Summary of Remaining Issues on UL Power Control_Revised, 3rd Generation Partnership Project (3GPP), Mobile Competence Centre; 650, Route Des Lucioles; F-06921 Sophia-Antipolis, vol. RAN WG1, No. Reno, USA; Nov. 27, 2017-Dec. 1, 2017, Nov. 27, 2017, XP051363828, 21 pages, Retrieved from the Internet: URL: http://www.3gpp.org/ftp/Meetings%5F3GPP%5FSYNC/RAN1/Docs/ [retrieved on Nov. 27, 2017] p. 6.
Huawei, "Performance of UL multiple antenna transmission for PUCCH[online]," 3GPP TSG-RAN WG1#58 R1-093052, 8 pages, Internet<URL: http://www.3gpp.org/ftp/tsg_ran/WG1_RL1/TSGR1_58/Docs/R1-093052.zip>, Aug. 18, 2009, section 2 and table 2.
Intel Corporation: "UCI Contents and UL Control Channel Formats", 3GPP Draft; R1-1609536 Intel UCI Content NR PUCCH, 3rd Generation Partnership Project (3GPP), Mobile Competence Centre; 650, Route Des Lucioles; F-06921 Sophia-Anti Polis Cedex; France, vol. RAN WG1, No. Lisbon, Portugal; Oct. 1, 2016, XP051159606, Retrieved from the Internet: URL: http://www.3gpp.org/ftp/tsg_ran/WG1_RL1/TSGR1_86b/Docs/ [retrieved on Oct. 1, 2016], 6 pages, section 4 and 5.

* cited by examiner

SIMULTANEOUS UPLINK TRANSMISSIONS USING SPATIAL MULTIPLEXING

CROSS REFERENCES

The present application for patent claims the benefit of U.S. Provisional Patent Application No. 62/640,566 by Yang et al., entitled "SIMULTANEOUS UPLINK TRANSMISSIONS USING SPATIAL MULTIPLEXING," filed Mar. 8, 2018, and to U.S. Provisional Patent Application No. 62/700,172 by Yang et al., entitled "SIMULTANEOUS UPLINK TRANSMISSIONS USING SPATIAL MULTIPLEXING," filed Jul. 18, 2018, assigned to the assignee hereof, and expressly incorporated by reference in their entirety herein.

BACKGROUND

The following relates generally to wireless communication, and more specifically to simultaneous uplink transmissions using spatial multiplexing.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, wireless devices may be capable of simultaneously transmitting messages using different time or frequency resources. However, in some wireless communications systems, simultaneous transmission by a UE using the same time and frequency resources may be desirable.

SUMMARY

The described techniques relate to improved methods, systems, devices, or apparatuses that support simultaneous uplink transmissions using spatial multiplexing. Generally, the described techniques provide for spatial multiplexing configurations that enable a user equipment (UE) to spatially multiplex two or more uplink channels for simultaneous transmission such that collisions between the uplink channels are avoided. For example, a UE may receive an indication of a spatial multiplexing configuration from a base station. The UE may also identify two or more uplink channels for simultaneous transmission on a same component carrier, where each uplink channel may be a different type of uplink channel. For example, the uplink channels may include a physical uplink control channel (PUCCH), a physical uplink shared channel (PUSCH), a physical random access channel (PRACH), a sounding reference signal (SRS), etc. In any event, the UE may spatially multiplex the two or more uplink channels on a same set of time/frequency resources on the component carrier in accordance with the spatial multiplexing configuration. The spatially multiplexed uplink channels may be simultaneously transmitted by the UE on the set of resources, where the uplink channels may be sent to the same transmission/reception point (TRP) (e.g., a base station, a remote radio head (RRH) of a base station, a cell of a base station, a sector of a base station, etc.) or to different TRPs. In some examples, multiple sets of spatial parameters may be used for the simultaneous transmission of the multiple uplink channels. For instance, respective sets of spatial parameters (e.g., an indication of a set of antenna ports, a number of layers, spatial domain precoders, and the like) may be applied to each spatially multiplexed uplink channel that is simultaneously transmitted by the UE. The spatial parameters may be indicated to the UE by the base station, for example, via radio resource control (RRC) signaling or via downlink control information (DCI).

A method of wireless communication is described. The method may include receiving an indication of a spatial multiplexing configuration for transmitting two or more uplink channels, identifying, from the two or more uplink channels, a first uplink channel and a second uplink channel for transmission on a component carrier, spatially multiplexing the first uplink channel and the second uplink channel on a set of resources of the component carrier in accordance with the spatial multiplexing configuration, and simultaneously transmitting the spatially multiplexed first uplink channel and second uplink channel on the set of resources.

An apparatus for wireless communication is described. The apparatus may include means for receiving an indication of a spatial multiplexing configuration for transmitting two or more uplink channels, means for identifying, from the two or more uplink channels, a first uplink channel and a second uplink channel for transmission on a component carrier, means for spatially multiplexing the first uplink channel and the second uplink channel on a set of resources of the component carrier in accordance with the spatial multiplexing configuration, and means for simultaneously transmitting the spatially multiplexed first uplink channel and second uplink channel on the set of resources.

Another apparatus for wireless communication is described. The apparatus may include a processor, memory coupled with the processor, and instructions stored in the memory. The instructions may be operable to cause the processor to receive an indication of a spatial multiplexing configuration for transmitting two or more uplink channels, identify, from the two or more uplink channels, a first uplink channel and a second uplink channel for transmission on a component carrier, spatially multiplex the first uplink channel and the second uplink channel on a set of resources of the component carrier in accordance with the spatial multiplexing configuration, and simultaneously transmit the spatially multiplexed first uplink channel and second uplink channel on the set of resources.

A non-transitory computer-readable medium for wireless communication is described. The non-transitory computer-readable medium may include instructions operable to cause a processor to receive an indication of a spatial multiplexing configuration for transmitting two or more uplink channels, identify, from the two or more uplink channels, a first uplink channel and a second uplink channel for transmission on a component carrier, spatially multiplex the first uplink channel and the second uplink channel on a set of resources of the component carrier in accordance with the spatial multiplexing configuration, and simultaneously transmit the spatially multiplexed first uplink channel and second uplink channel on the set of resources.

In some examples of the method, apparatus, and non-transitory computer-readable medium described herein, simultaneously transmitting the spatially multiplexed first uplink channel and second uplink channel includes simultaneously transmitting the spatially multiplexed first uplink channel and second uplink channel using different transmit antennas or different antenna ports. In some examples of the method, apparatus, and non-transitory computer-readable medium described herein, the two or more uplink channels include at least two channels from the group consisting of a PUCCH, a PUSCH, a PRACH, and an SRS. In some examples of the method, apparatus, and non-transitory computer-readable medium described herein, the first uplink channel includes a PUCCH and the second uplink channel includes a PUSCH.

Some examples of the method, apparatus, and non-transitory computer-readable medium described herein may further include processes, features, means, or instructions for identifying, from the spatial multiplexing configuration, multiple sets of spatial parameters for the simultaneous transmission of the first uplink channel and the second uplink channel, where each set of spatial parameters from the multiple sets of spatial parameters may be applied to a respective uplink channel. In some examples of the method, apparatus, and non-transitory computer-readable medium described herein, each set of spatial parameters includes an indication of a set of antenna ports, a number of layers, spatial domain precoders, or a combination thereof.

Some examples of the method, apparatus, and non-transitory computer-readable medium described herein may further include processes, features, means, or instructions for receiving an indication of the set of spatial parameters via RRC signaling, or DCI, or a combination thereof. Some examples of the method, apparatus, and non-transitory computer-readable medium described herein may further include processes, features, means, or instructions for identifying an alignment of respective demodulation reference signals (DMRSs) for the first uplink channel and the second uplink channel based on the spatial multiplexing configuration, where the first uplink channel and the second uplink channel may have different lengths and different starting positions.

Some examples of the method, apparatus, and non-transitory computer-readable medium described herein may further include processes, features, means, or instructions for transmitting, with the spatially multiplexed first uplink channel and second uplink channel on the set of resources, a first DMRS for the first uplink channel and a second DMRS for the second uplink channel, where the first DMRS and the second DMRS may be transmitted within a same orthogonal frequency division multiplexing (OFDM) symbol period in accordance with the identified alignment.

Some examples of the method, apparatus, and non-transitory computer-readable medium described herein may further include processes, features, means, or instructions for identifying multiple sets of DMRS ports based on the spatial multiplexing configuration, where a first set of DMRS ports may be part of a first DMRS group associated with a first set of antenna ports and a second set of DMRS ports may be part of a second DMRS group associated with a second set of antenna ports.

In some examples of the method, apparatus, and non-transitory computer-readable medium described herein, the first DMRS may be time-division multiplexed with data in the first uplink channel and the second DMRS may be time-division multiplexed with data in the second uplink channel. In some examples of the method, apparatus, and non-transitory computer-readable medium described herein, the first uplink channel includes an SRS and the second uplink channel includes a PUCCH, or a PUSCH, or a combination thereof. In some examples of the method, apparatus, and non-transitory computer-readable medium described herein, the first uplink channel includes an SRS and the second uplink channel includes a PUCCH, a PUSCH, or a combination thereof. In some examples of the method, apparatus, and non-transitory computer-readable medium described herein, the first uplink channel and the second uplink channel are different types of channels. Some examples of the method, apparatus, and non-transitory computer-readable medium described herein may further include processes, features, means, or instructions for transmitting, with the spatially multiplexed first uplink channel and second uplink channel on the set of resources, the SRS and data within a same OFDM symbol period on the first uplink channel.

Some examples of the method, apparatus, and non-transitory computer-readable medium described herein may further include processes, features, means, or instructions for transmitting, with the spatially multiplexed first uplink channel and second uplink channel on the set of resources, the SRS and a DMRS within a same OFDM symbol period on the first uplink channel, the DMRS being associated with the PUCCH, or the PUSCH, or a combination thereof, where the SRS and the DMRS may be frequency division multiplexed.

In some examples of the method, apparatus, and non-transitory computer-readable medium described herein, simultaneously transmitting the spatially multiplexed first uplink channel and second uplink channel includes transmitting the first uplink channel to the base station. Some examples of the method, apparatus, and non-transitory computer-readable medium described herein may further include processes, features, means, or instructions for transmitting the second uplink channel to a different base station. In some examples of the method, apparatus, and non-transitory computer-readable medium described herein, simultaneously transmitting the spatially multiplexed first uplink channel and second uplink channel includes transmitting the first uplink channel to a first TRP. Some examples of the method, apparatus, and non-transitory computer-readable medium described herein may further include processes, features, means, or instructions for transmitting the second uplink channel to a different TRP.

In some examples of the method, apparatus, and non-transitory computer-readable medium described herein, the first uplink channel includes a first PUCCH and the second uplink channel includes a second PUCCH different from the first PUCCH. In some examples of the method, apparatus, and non-transitory computer-readable medium described herein, the first PUCCH includes first hybrid automatic repeat request (HARQ) feedback transmitted to the first TRP and the second PUCCH includes second HARQ feedback transmitted to the second TRP.

In some examples of the method, apparatus, and non-transitory computer-readable medium described herein, the first TRP, or the different TRP, or both, include a base station, a RRH, a cell of the base station, a sector of the base station, or a combination thereof. In some examples of the method, apparatus, and non-transitory computer-readable medium described herein, the second uplink channel includes a PRACH and the first uplink channel includes a PUCCH, or a PUSCH, or an SRS, or a combination thereof.

In some examples of the method, apparatus, and non-transitory computer-readable medium described herein, the first uplink channel is quasi co-located with a first set of downlink reference signals and the second uplink channel is quasi co-located with a second set of downlink reference signals different from the first set of downlink reference signals. In some examples of the method, apparatus, and non-transitory computer-readable medium described herein, the spatially multiplexed first uplink channel and second uplink channel are quasi co-located with a same set of downlink reference signals. In some examples of the method, apparatus, and non-transitory computer-readable medium described herein, the first uplink channel is transmitted in accordance with a first service and the second uplink channel is transmitted in accordance with a second service different from the first service.

In some examples of the method, apparatus, and non-transitory computer-readable medium described herein, the first uplink channel is a dynamically scheduled uplink transmission and the second uplink channel is an uplink transmission configured via RRC messaging. Some examples of the method, apparatus, and non-transitory computer-readable medium described herein may further include processes, features, means, or instructions for determining a power control configuration for simultaneously transmitting the spatially multiplexed first uplink channel and second uplink channel based on the spatial multiplexing configuration, where the power control configuration includes a first transmit power for the first uplink channel and a second transmit power for the second uplink channel.

Some examples of the method, apparatus, and non-transitory computer-readable medium described herein may further include processes, features, means, or instructions for determining that the first uplink channel includes an SRS and the second uplink channel includes a PUCCH, or a PUSCH, or a combination thereof. Some examples of the method, apparatus, and non-transitory computer-readable medium described herein may further include processes, features, means, or instructions for de-boosting the first transmit power based on the determination. In some examples of the method, apparatus, and non-transitory computer-readable medium described herein, the indication of the spatial multiplexing configuration is received from a base station.

A method of wireless communication is described. The method may include determining a spatial multiplexing configuration for a UE to simultaneously transmit two or more uplink channels on a component carrier via spatial multiplexing, identifying multiple sets of spatial parameters for at least a first uplink channel and a second uplink channel of the two or more uplink channels based on the spatial multiplexing configuration, where each set of spatial parameters from the multiple sets of spatial parameters is to be applied to a respective uplink channel, transmitting an indication of the spatial multiplexing configuration and the multiple sets of spatial parameters to the UE, and receiving, from the UE, the first uplink channel, or the second uplink channel, or a combination thereof, on a set of resources of the carrier in accordance with each set of spatial parameters.

An apparatus for wireless communication is described. The apparatus may include means for determining a spatial multiplexing configuration for a UE to simultaneously transmit two or more uplink channels on a component carrier via spatial multiplexing, means for identifying multiple sets of spatial parameters for at least a first uplink channel and a second uplink channel of the two or more uplink channels based on the spatial multiplexing configuration, where each set of spatial parameters from the multiple sets of spatial parameters is to be applied to a respective uplink channel, means for transmitting an indication of the spatial multiplexing configuration and the multiple sets of spatial parameters to the UE, and means for receiving, from the UE, the first uplink channel, or the second uplink channel, or a combination thereof, on a set of resources of the carrier in accordance with each set of spatial parameters.

Another apparatus for wireless communication is described. The apparatus may include a processor, memory coupled with the processor, and instructions stored in the memory. The instructions may be operable to cause the processor to determine a spatial multiplexing configuration for a UE to simultaneously transmit two or more uplink channels on a component carrier via spatial multiplexing, identify multiple sets of spatial parameters for at least a first uplink channel and a second uplink channel of the two or more uplink channels based on the spatial multiplexing configuration, where each set of spatial parameters from the multiple sets of spatial parameters is to be applied to a respective uplink channel, transmit an indication of the spatial multiplexing configuration and the multiple sets of spatial parameters to the UE, and receive, from the UE, the first uplink channel, or the second uplink channel, or a combination thereof, on a set of resources of the carrier in accordance with each set of spatial parameters.

A non-transitory computer-readable medium for wireless communication is described. The non-transitory computer-readable medium may include instructions operable to cause a processor to determine a spatial multiplexing configuration for a UE to simultaneously transmit two or more uplink channels on a component carrier via spatial multiplexing, identify multiple sets of spatial parameters for at least a first uplink channel and a second uplink channel of the two or more uplink channels based on the spatial multiplexing configuration, where each set of spatial parameters from the multiple sets of spatial parameters is to be applied to a respective uplink channel, transmit an indication of the spatial multiplexing configuration and the multiple sets of spatial parameters to the UE, and receive, from the UE, the first uplink channel, or the second uplink channel, or a combination thereof, on a set of resources of the carrier in accordance with each set of spatial parameters.

In some examples of the method, apparatus, and non-transitory computer-readable medium described herein, the two or more uplink channels include at least two channels from the group consisting of a PUCCH, a PUSCH, a PRACH, and an SRS. Some examples of the method, apparatus, and non-transitory computer-readable medium described herein may further include processes, features, means, or instructions for determining an alignment of respective DMRSs for the first uplink channel and the second uplink channel based on the spatial multiplexing configuration, where the first uplink channel and the second uplink channel may have different lengths and different starting positions. Some examples of the method, apparatus, and non-transitory computer-readable medium described herein may further include processes, features, means, or instructions for transmitting an indication of the alignment to the UE.

Some examples of the method, apparatus, and non-transitory computer-readable medium described herein may further include processes, features, means, or instructions for determining multiple sets of DMRS ports based on the spatial multiplexing configuration, where a first set of DMRS ports for the first uplink channel may be part of a first DMRS group associated with a first set of antenna ports and a second set of DMRS ports for the second uplink channel may be part of a second DMRS group associated with a second set of antenna ports. Some examples of the method, apparatus, and non-transitory computer-readable medium described herein may further include processes, features, means, or instructions for transmitting an indication of the determined multiple sets of DMRS ports to the UE.

Some examples of the method, apparatus, and non-transitory computer-readable medium described herein may further include processes, features, means, or instructions for transmitting, over a backhaul link, an indication of the set of spatial parameters to a different base station, where the first uplink channel may be received from the UE and includes a PUCCH, or a PUSCH, or a combination thereof.

In some examples of the method, apparatus, and non-transitory computer-readable medium described herein, the first uplink channel may be received from the UE and includes a PUCCH, or a PUSCH, or a combination thereof, and where a simultaneous transmission of the second uplink channel may be treated as interference.

In some examples of the method, apparatus, and non-transitory computer-readable medium described herein, transmitting the indication of the set of spatial parameters includes transmitting the indication of the set of spatial parameters via RRC signaling, or DCI, or a combination thereof. In some examples of the method, apparatus, and non-transitory computer-readable medium described herein, receiving the first uplink channel, or the second uplink channel, or a combination thereof includes receiving the first uplink channel, or the second uplink channel, or a combination thereof at a TRP including a base station, a RRH, a cell of the base station, a sector of the base station, or a combination thereof. In some examples of the method, apparatus, and non-transitory computer-readable medium described herein, the set of spatial parameters include an indication of a set of antenna ports, a number of layers, spatial domain precoders, or a combination thereof.

DETAILED DESCRIPTION

Figure 1:
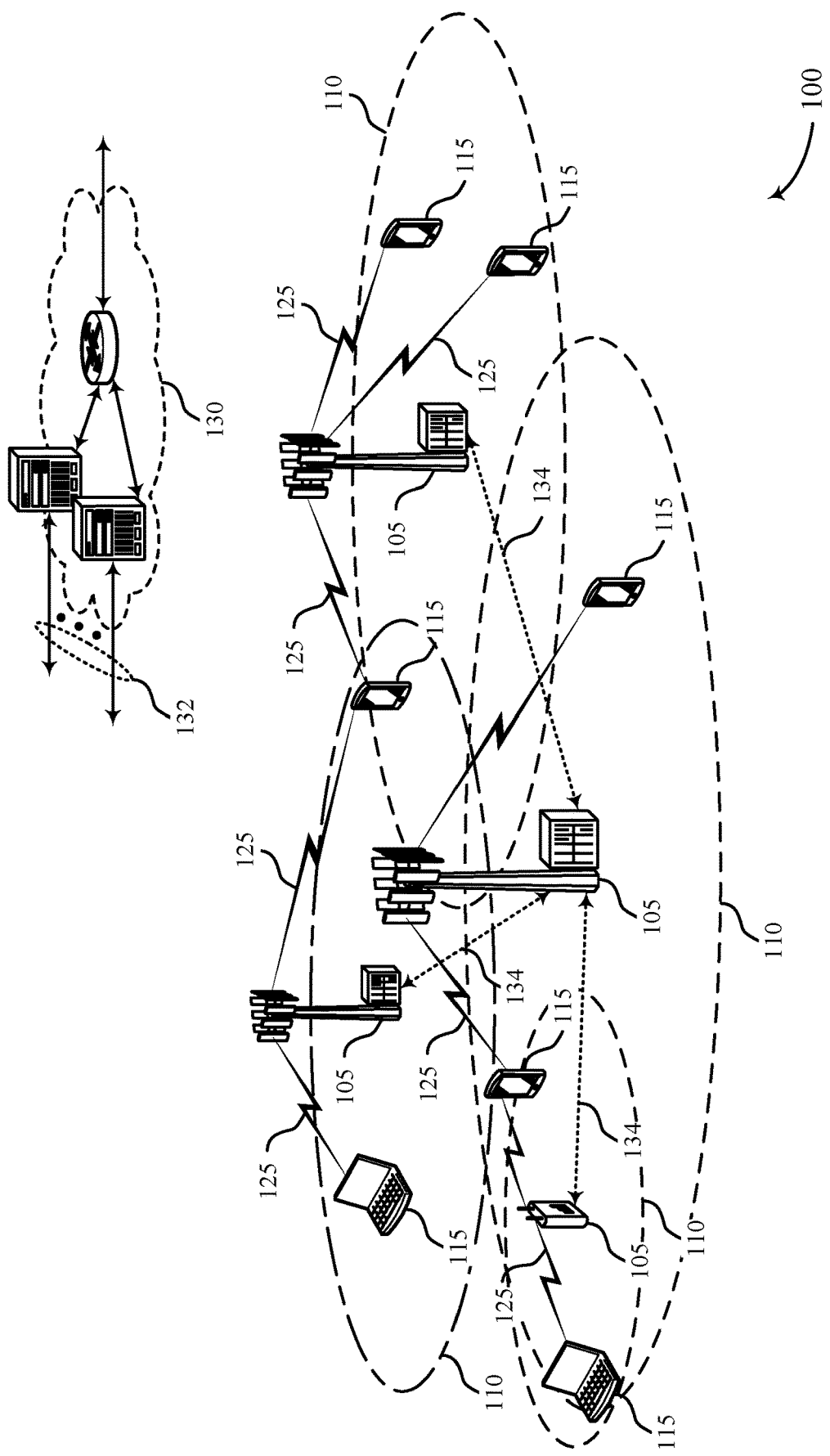
FIG. 1 illustrates an example of a wireless communications system that supports simultaneous uplink transmissions using spatial multiplexing in accordance with aspects of the present disclosure.

Some wireless communications systems may support the use of simultaneous transmissions from multiple antennas at a single device. For instance, a user equipment (UE) may be equipped with multiple antennas and/or transmit chains. Such devices may thus be capable of simultaneously transmitting multiple data streams to another device (e.g., a base station). As an example, the UE may send simultaneous transmissions (e.g., of a physical uplink shared channel (PUSCH)) using multiple antennas/transmit chains.

However, some systems may only support multiple uplink transmissions that are multiplexed using time-division multiplexing (TDM) within a single component carrier (CC). For example, frequency division multiplexing (FDM) of multiple uplink channels within a CC may result in inter-modulation distortion of the transmitted signals. Additionally, the simultaneous uplink transmissions may result in collisions between different channels sent in the same CC. These collisions may lead to additional complexity introduced in the system, particularly when multiple uplink transmissions are due at the same time. For example, various rules for resolving collisions (e.g., which channel is to be transmitted, which channel is to be dropped, which channel may be delayed, and so forth) may be difficult to implement due the complexity associated with such rules.

To avoid the aforementioned collisions (and the complex rules to resolve such collisions), the techniques described herein may enable a UE to multiplex various uplink transmissions in the spatial domain using multiple transmit chains. For example, simultaneous uplink channels that are spatially multiplexed on a set of resources may be sent via multiple transmit chains/antennas in the same CC. That is, spatial-division multiplexing (SDM) may be used for the transmission of at least two uplink channels. These uplink channels may include a PUSCH, a physical uplink control channel (PUCCH), a sounding reference signal (SRS), a physical random access channel (PRACH), etc. In some examples, the spatially multiplexed uplink channels may simultaneously target the same cell or different cells. For instance, PUCCH/PUSCH may be transmitted to a first cell (e.g., cell A), whereas PRACH may be transmitted to a second cell (e.g., cell B). In such cases, the transmissions directed to different cells may enable, for example, handover processes to a different cell with minimal or no delay. In some examples, the spatially multiplexed uplink channels may be simultaneously transmitted by the UE on the set of resources, and the uplink channels may be sent to the same transmission/reception point (TRP) (e.g., a base station, a remote radio head (RRH) of a base station, a cell of a base station, a sector of a base station, etc.) or to different TRPs.

To utilize SDM for simultaneous uplink transmissions, spatial domain resources may be configured/allocated for respective uplink transmissions. For example, resources configured for the transmission of PUCCH and PUSCH may include one or more spatial parameters, where different sets of spatial parameters may be applied to other uplink channels. The spatial parameters may include a number of antenna ports, a number of spatial layers, spatial domain precoders, etc. In some cases, the spatial parameters may be communicated to the UE via signaling from the base station. For instance, radio resource control (RRC) signaling or downlink control information (DCI) may provide an indication of the sets of spatial parameters to be used for the simultaneous uplink transmissions. Additionally, power control for different channels may be configured, which may enable successive cancellation.

Aspects of the disclosure are initially described in the context of a wireless communications system. Further examples are provided that illustrate an alignment of demodulation reference signal (DMRS) in symbol periods of multiple uplink channels. Aspects of the disclosure are further illustrated by and described with reference to apparatus diagrams, system diagrams, and flowcharts that relate to simultaneous uplink transmissions using spatial multiplexing.

FIG. 1 illustrates an example of a wireless communications system 100 that supports simultaneous uplink transmissions using spatial multiplexing in accordance with aspects of the present disclosure. Wireless communications system 100 includes base stations 105, UEs 115, and a core network 130. In some examples, wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. Wireless communications system 100 may support SDM techniques for the transmission of multiple uplink channels from a UE 115.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. Wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, a remote radio head (RRH), a remote radio unit (RRU), or a transmission/reception point (TRP). In some configurations, various functions of each access network entity or base station 105 may be distributed across various network devices (e.g., radio heads and access network controllers) or consolidated into a single network device (e.g., a base station 105). In some cases, each access network transmission entity may communicate with each other via wired (e.g., optical fiber lines) or wireless links.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as time division duplexing (TDD) systems, may transmit an SSS but not a PSS. Both the PSS and the SSS may be located in the central 62 and 72 subcarriers of a carrier, respectively. In some cases, PSS, SSS, and/or broadcast information (e.g., a physical broadcast channel (PBCH)) may be transmitted within different synchronization signal blocks on respective directional beams, where one or more synchronization signal blocks may be included within a synchronization signal burst (SSB). After receiving the PSS and SSS, the UE 115 may receive a master information block (MIB), which may be transmitted in the PBCH. The MIB may contain system bandwidth information, an SFN, and a physical hybrid automatic repeat request (HARD) indicator channel (PHICH) configuration. After decoding the MIB, the UE 115 may receive one or more system information blocks (SIBs). For example, a first SIB, SIB1, may contain cell access parameters and scheduling information for other SIBs. Decoding SIB1 may enable the UE 115 to receive a second SIB, SIB2. SIB2 may contain RRC configuration information related to random access channel (RACH) procedures, paging, PUCCH, PUSCH, power control, SRS, and cell barring.

After the UE 115 decodes SIB2, it may transmit a RACH preamble to a base station 105. For example, the RACH preamble may be randomly selected from a set of 64 predetermined sequences. This may enable the base station 105 to distinguish between multiple UEs 115 trying to access the system simultaneously. The base station 105 may respond with a random access response that provides an uplink resource grant, a timing advance and a temporary cell-random network temporary identifier (C-RNTI). The UE 115 may then transmit an RRC connection request along with a temporary mobile subscriber identifier (TMSI) (if the UE 115 has previously been connected to the same wireless network) or a random identifier. The RRC connection request may also indicate the reason the UE 115 is connecting to the network (e.g., emergency, signaling, data exchange, etc.). The base station 105 may respond to the connection request with a contention resolution message addressed to the UE 115, which may provide a new C-RNTI. If the UE 115 receives a contention resolution message with the correct identification, it may proceed with RRC setup. If the UE 115 does not receive a contention resolution message (e.g., if there is a conflict with another UE 115) it may repeat the RACH process by transmitting a new RACH preamble.

Data may be divided into logical channels, transport channels, and physical layer channels. Channels may also be classified into control channels and traffic channels. Logical control channels may include paging control channels (PCCHs) for paging information, broadcast control channels (BCCHs) for broadcast system control information, multicast control channels (MCCHs) for transmitting multimedia broadcast/multicast (MBMS) scheduling and control information, dedicated control channels (DCCHs) for transmitting dedicated control information, common control channels (CCCHs) for random access information, dedicated traffic control channels (DTCHs) for dedicated UE data, and multicast traffic channels (MTCHs) for multicast data. Downlink transport channels may include broadcast channels (BCHs) for broadcast information, downlink shared channels (DL-SCHs) for data transfer, paging channels (PCHs) for paging information, and multicast channels (MCHs) for multicast transmissions. Uplink transport channels may include a RACH for access and uplink shared channels (UL-SCHs) for data. Downlink physical channels may include a PBCH for broadcast information, physical control format indicator channel (PCFICH) for control format information, physical downlink control channel (PDCCH) for control and scheduling information, PHICH for HARQ status messages, physical downlink shared channel (PDSCH) for user data and physical multicast channel (PMCH) for multicast data. Uplink physical channels may include physical random access channel (PRACH) for access messages, PUCCH for control data, and PUSCH for user data.

PDCCH carries DCI in control channel elements (CCEs), which may consist of nine logically contiguous resource element groups (REGs), where each REG contains 4 resource elements (REs). DCI includes information regarding downlink scheduling assignments, uplink resource grants, transmission scheme, uplink power control, HARQ information, modulation and coding scheme (MCS) and other information. The size and format of the DCI messages can differ depending on the type and amount of information that is carried by the DCI. For example, if spatial multiplexing is supported, the size of the DCI message is large compared to contiguous frequency allocations. Similarly, for a system that employs multiple-input multiple-output (MIMO) communications, the DCI must include additional signaling information. DCI size and format depend on the amount of information as well as factors such as bandwidth, the number of antenna ports, and duplexing mode.

PUCCH may be mapped to a control channel defined by a code and two consecutive resource blocks (RBs). Uplink control signaling may depend on the presence of timing synchronization for a cell. PUCCH resources for SR and channel quality indicator (CQI) reporting may be assigned (and revoked) through RRC signaling. In some cases, resources for SR may be assigned after acquiring synchronization through a RACH procedure. In other cases, an SR may not be assigned to a UE 115 through the RACH (i.e., synchronized UEs 115 may or may not have a dedicated SR channel). PUCCH resources for SR and CQI may be lost when the UE 115 is no longer synchronized.

An SRS may be transmitted by a UE 115 using a predetermined sequence (e.g., a Zadoff-Chu sequence) so that a base station 105 may estimate the uplink channel quality. An SRS transmission may not be associated with transmission of data on another channel, and may be transmitted periodically on a wide bandwidth (e.g., a bandwidth including more subcarriers than are allocated for uplink data transmission). In some examples, an SRS may be scheduled on multiple antenna ports and may still be considered to be a single SRS transmission. An SRS transmission may be categorized as a Type 0 (periodically transmitted at equally spaced intervals) SRS or as a Type 1 (aperiodic) SRS. In either case, the base station 105 may control the timing of SRS transmissions by notifying the UE 115 of which transmission time intervals (TTIs) (e.g., subframes) may support the transmission of the SRS. Additionally, a sounding period (e.g., 2 to 230 subframes) and an offset within the sounding period may be configured for the UE 115. As a result, the UE 115 may transmit the SRS when a subframe that supports SRS transmissions coincides with the configured sounding period. In some cases, the SRS may be transmitted during a temporally last orthogonal frequency-division multiplexing (OFDM) symbol of the subframe or, in some cases, may be sent during an uplink portion of a special subframe. Data gathered by a base station 105 from an SRS may be used to inform the scheduling of uplink transmissions by the UE 115, such as frequency dependent transmissions. A base station 105 may also utilize an SRS to check timing alignment status and send time alignment commands to the UE 115.

In some cases, a UE 115 may be transferred from a serving base station 105 (known as a source base station 105) to another base station 105 (known as a target base station 105). For example, the UE 115 may be moving into the coverage area of the target base station 105, or the target base station 105 may be capable of providing better service for the UE 115 or relieving the source base station 105 of excess load. The transition may be referred to as a "handover." Prior to a handover, the source base station 105 may configure the UE 115 with procedures for measuring the signal quality of neighboring base stations 105. The UE 115 may then respond with a measurement report. The source base station 105 may use the measurement report to make the handover decision. The decision may also be based on radio resource management (RRM) factors, such as network load and interference mitigation. When the handover decision is made, the source base station 105 may send a handover request message to the target base station 105, which may include context information to prepare the target base station 105 to serve the UE 115. The target base station 105 may make an admission control decision, for example, to ensure that it can meet the quality of service (QoS) standards of the UE 115. The target base station 105 may then configure resources for the incoming UE 115, and send a handover request acknowledge message to the source base station 105, which may include RRC information to be passed on to the UE 115. The source base station 105 may then direct the UE 115 to perform the handover, and pass a status transfer message to the target base station with packet data convergence protocol (PDCP) bearer status information. The UE 115 may attach to the target base station 105 via a RACH procedure. Through simultaneous transmission of multiple uplink channels, a UE 115 may be capable of handover procedures from the source base station 105 to the target base station 105 with minimal or no delay. For instance, and as described in further detail herein, the UE 115 may be in communication with the source base station 105 while simultaneously performing the RACH procedure with the target base station 105.

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation (CA) configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), TDD, or a combination of both.

In some examples, base station 105 or UE 115 may be equipped with multiple antennas, which may be used to employ techniques such as transmit diversity, receive diversity, MIMO communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO and beamforming operations.

In some cases, wireless communications system 100 may be a packet-based network that operate according to a layered protocol stack. In the user plane, communications at the bearer or PDCP layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or discrete Fourier transform-spread-OFDM (DFT-s-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a CA configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using TDM techniques, FDM techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink CCs and one or more uplink CCs according to a CA configuration. CA may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Wireless communications system 100 may support spatial multiplexing configurations that enable a UE 115 to spatially multiplex two or more uplink channels for simultaneous transmission such that collisions between the uplink channels are avoided. For example, a UE 115 may receive an indication of a spatial multiplexing configuration from a base station 105. The UE 115 may also identify two or more uplink channels for simultaneous transmission on a same component carrier, where each uplink channel may be a different type of uplink channel. For example, the uplink channels may include PUCCH, PUSCH, PRACH, an SRS, etc. In any case, the UE 115 may spatially multiplex the two or more uplink channels on a same set of time/frequency resources on the component carrier in accordance with the spatial multiplexing configuration. Accordingly, the spatially multiplexed uplink channels may be simultaneously transmitted by the UE 115 on the set of time/frequency resources, where the uplink channels may be sent to the same base station 105 or to different base stations 105. In some examples, multiple sets of spatial parameters may be utilized for the simultaneous transmission of the multiple uplink channels. For instance, respective sets of spatial parameters (e.g., an indication of a set of antenna ports, a number of layers, spatial domain precoders, and the like) may be applied to each spatially multiplexed uplink channel that is simultaneously transmitted by the UE 115. The spatial parameters may be indicated to the UE 115 by the base station 105, for example, via RRC signaling or via DCI.

Figure 2:
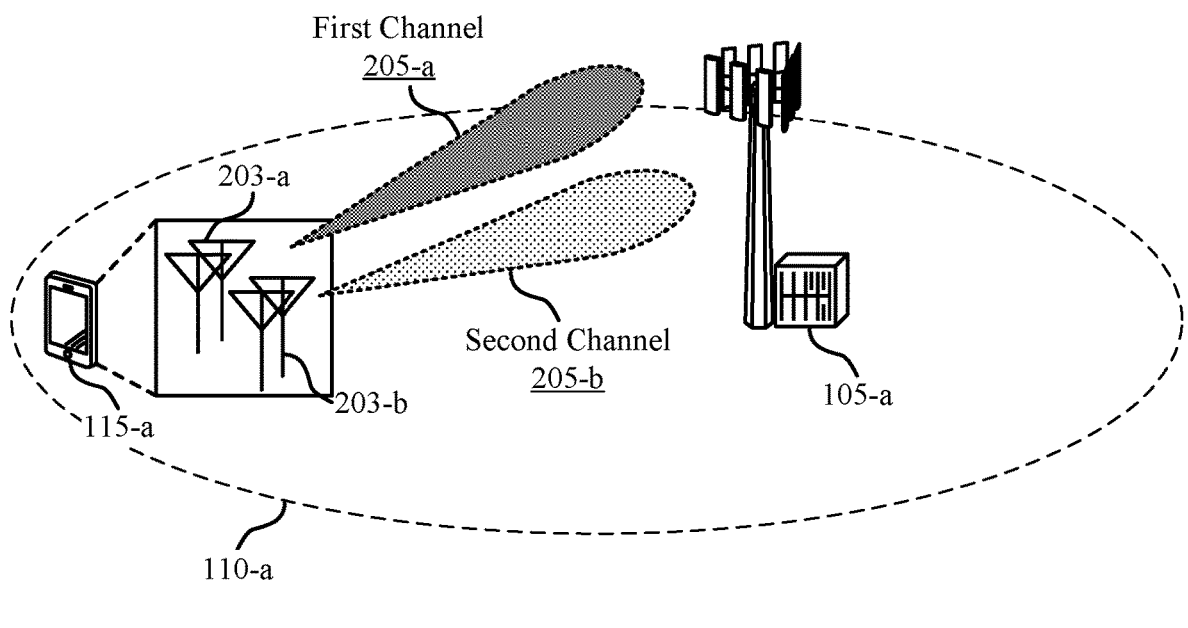
FIGS. 2 and 3 illustrate examples of wireless communications systems that support simultaneous uplink transmissions using spatial multiplexing in accordance with aspects of the present disclosure.

FIG. 2 illustrates an example of a wireless communications system 200 that supports simultaneous uplink transmissions using spatial multiplexing in accordance with aspects of the present disclosure. In some examples, wireless communications system 200 may implement aspects of wireless communications system 100. For example, wireless communications system 200 may include a base station 105-a and a UE 115-a, which may be examples of the corresponding devices described with reference to FIG. 1. Wireless communications system may illustrate an example of a system that supports the simultaneous transmission of multiple uplink channels on a set of resources.

In some cases, UE 115-a may be capable of simultaneous uplink transmissions using multiple antennas and/or transmit chains. For example, UE 115-a may be equipped with various sets of antennas 203 and/or radio chains that may simultaneously process multiple data streams for transmission to base station 105-a. UE 115-a may thus be capable of sending simultaneous transmissions of different uplink channels 205 (e.g., uplink transmissions including PUSCH, PUCCH, SRS, etc.) using the respective antennas/transmit chains. As an example, a first uplink channel 205-a may be transmitted using a first set of antennas 203-a (e.g., associated with a first beam) and a second uplink channel 205-b may be transmitted using a second set of antennas 203-b (e.g., associated with a second beam). These uplink channels may be multiplexed on the same set of time and frequency resources within one CC. Further, although two sets of antennas 203 are illustrated in FIG. 2, UE 115-a may include a different number of antennas 203 or respective sets of antennas 203 that may each be used to transmit different uplink channels 205.

UE 115-a may further support multiplexing of various uplink transmissions in the spatial domain. For example, simultaneous uplink channels that are spatially multiplexed on a set of resources may be sent via multiple transmit chains/antennas in the same CC. That is, SDM may be used for the transmission of two or more uplink channels 205. UE 115-a may accordingly transmit first uplink channel 205-a at the same time as second uplink channel 205-b. These uplink channels 205 may include PUCCH, PUSCH, SRS, PRACH, or any combination thereof. In some cases, first uplink channel 205-a may be a PUCCH, and second uplink channel 205-b may be a PUSCH. In this case, the PUCCH may include a service request (SR), and the PUSCH may include a grant-free uplink transmission. In other cases, both first uplink channel 205-a and second uplink channel 205-b may include PUCCH. In these cases, different types of uplink control information may be included in the multiple transmissions of PUCCH. For example, a first PUCCH (e.g., sent using first uplink channel 205-a) may include HARQ-ACK, and a second PUCCH (e.g., sent using second uplink channel 205-b) may include channel state information (CSI) feedback.

In some examples, the spatially multiplexed uplink channels may simultaneously target the same cell or different cells. For example, UE 115-a may transmit both first uplink channel 205-a and second uplink channel 205-b to base station 105-a. Additionally or alternatively, first uplink channel 205-a and second uplink channel 205-b may be used for different services supported by UE 115-a. For example, UE 115-a may be capable of communicating using different services, such as eMBB, ultra-reliable low latency communication (URLLC), or the like. As a result, UE 115-a may communicate using first uplink channel 205-a in accordance with a first service (e.g., eMBB) while simultaneously communicating using second uplink channel 205-b in accordance with a second service (e.g., URLLC). In some cases, UE 115-a may send grant-based transmissions using first uplink channel 205-a while sending grant-free transmissions on second uplink channel 205-b. In other examples, and as described in further detail herein, PUCCH/PUSCH may be transmitted to a first cell (e.g., cell A), whereas RACH (e.g., as part of a random access procedure) may be transmitted to a second cell (e.g., cell B) at the same time. In such cases, the transmissions directed to different cells may enable, for example, handover processes to a different cell with minimal or no delay.

To use SDM for simultaneous uplink transmissions, time/frequency resources may be configured/allocated for respective spatial transmissions. For example, resources configured for the transmission of PUCCH and PUSCH may include one or more spatial parameters, where different sets of spatial parameters may be applied to different uplink channels. The spatial parameters may include a number of antenna ports, a number of spatial layers, spatial domain precoders, etc. In some aspects, respective spatial parameters may be applied to each uplink channel 205. For example, multiple sets of spatial parameters may be configured, and one set of spatial parameters (e.g., Antenna port 0, 1 layer) may be applied to first uplink channel 205-a (e.g., PUCCH) and a different set of spatial parameters (e.g., Antenna ports 1 and 2, 2 layers, Precoder 1) may be applied to second uplink channel 205-b (e.g., PUSCH). Accordingly, PUCCH and PUSCH may be transmitted using different spatial parameters when multiplexed in the spatial domain. A receiving device (e.g., base station 105-a) may decode the PUCCH and PUSCH according to the multiple sets of spatial parameters. When scheduling simultaneous uplink channel transmissions, a base station 105 may ensure that the spatial parameters satisfies a threshold. For example, the base station 105 may ensure that a total number of spatial layers does not exceed the number of transmit antennas and/or antenna ports that are available and supported by a UE 115 for uplink transmissions.

In some cases, spatial parameters may be communicated to UE 115-a via signaling from base station 105-a. For instance, RRC signaling or DCI may provide an indication of the sets of spatial parameters to be used for the simultaneous uplink transmissions. In such cases, the signaling of spatial multiplexing configurations may be semi-static or dynamic, and may also be user-specific (e.g., based on the capabilities of respective UEs 115). In one example, a set of spatial parameters may be indicated by RRC signaling while another set of spatial parameters (e.g., for another uplink channel 205) may be indicated via DCI. Other schemes for signaling the spatial parameters for the different uplink channels 205 may be possible.

Power control for different uplink channels 205 may also be configured, which may enable successive interference cancellation at a receiver. For instance, when first uplink channel 205-a includes PUCCH/PUSCH and second uplink channel 205-b includes SRS, the transmit power for second uplink channel 205-b may be de-boosted such the data transmitted within PUCCH/PUSCH is protected. That is, there may be a joint consideration of power control for SRS and data transmissions. In some examples, the receiving device (e.g., base station 105-a) may first decode the PUCCH/PUSCH and remove the decoded PUCCH/PUSCH signal from the received signal. Base station 105-a may then perform channel estimations based on the SRS after removing the interference from the PUCCH/PUSCH.

Figure 3:
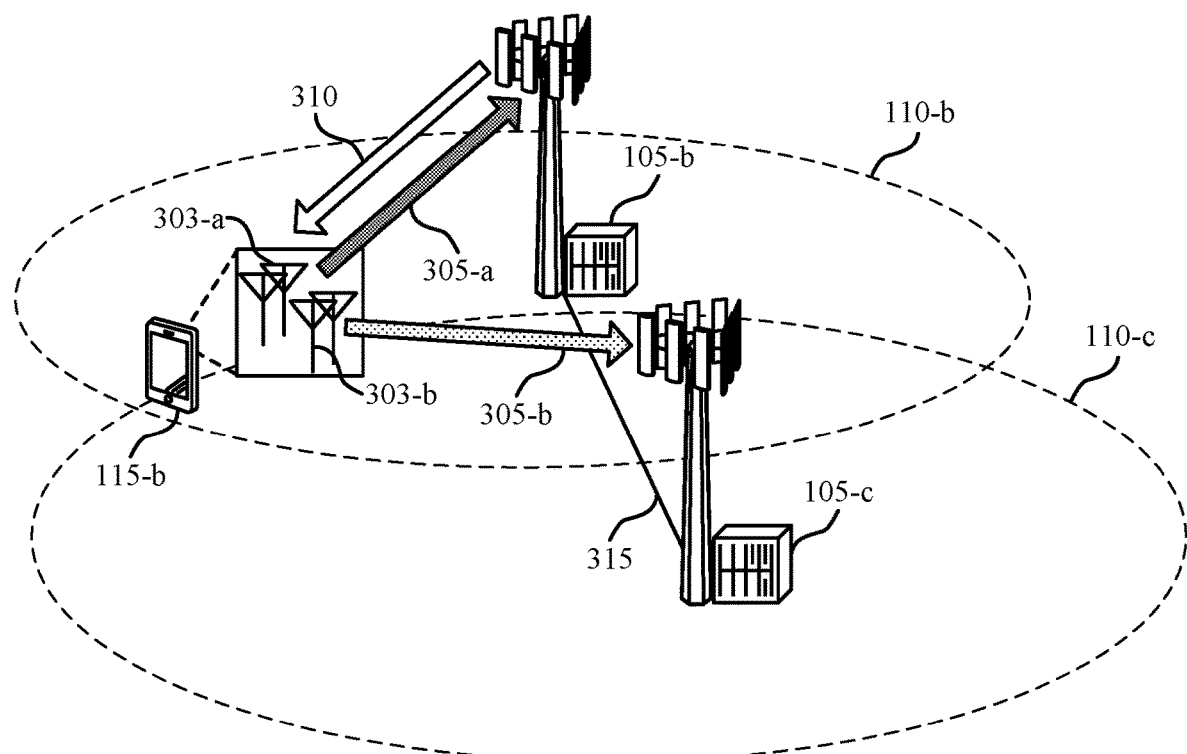

FIG. 3 illustrates an example of a wireless communications system 300 that supports simultaneous uplink transmissions using spatial multiplexing in accordance with aspects of the present disclosure. In some examples, wireless communications system 300 may implement aspects of wireless communications system 100. For example, wireless communications system 300 may include a UE 115-b and multiple base stations 105 (e.g., a first base station 105-b and a second base station 105-c), which may be examples of the corresponding devices described with reference to FIGS. 1 and 2. Wireless communications system 300 may illustrate an example of a system that supports the simultaneous transmission of multiple uplink channels to multiple base stations 105 for efficient handover procedures.

As described herein, UE 115-b may be capable of simultaneous transmissions using multiple antennas/antenna chains, and may accordingly implement the techniques for the transmission of multiple uplink channels 305 described herein. For instance, a first uplink channel 305-a may be transmitted using a first set of antennas 303-a (e.g., associated with a first beam) and a second uplink channel 305-b may be transmitted using a second set of antennas 303-b (e.g., associated with a second beam). UE 115-b may transmit first uplink channel 305-a at the same time as second uplink channel 305-b. These uplink channels 305 may include PUCCH, PUSCH, SRS, PRACH, or any combination thereof. In some examples, the spatially multiplexed uplink channels 305 may simultaneously target different cells. For example, PUCCH/PUSCH may be transmitted to a first cell (e.g., cell A) provided by first base station 105-b, whereas RACH may be transmitted to a second cell (e.g., cell B) provided by second base station 105-c. In such cases, UE 115-b may perform a handover from first base station 105-b to second base station 105-b with minimal or zero delay.

For example, UE 115-b may be in communication with first base station 105-b and may receive, for example, a transmission of PDCCH 310 from first base station 105-b. In some examples PDCCH 310 may include DCI that provides an indication of a spatial multiplexing configuration. Upon reception of the indication, UE 115-b may proceed to send simultaneous transmissions of different uplink channels 305 using multiple antennas 303/antenna chains. In some aspects, UE 115-b may be mobile and may be handed over from first base station 105-b to second base station 105-c. In such cases, while UE 115-b is in communication with first base station 105-b, UE 115-b may simultaneously begin access procedures (e.g., RACH procedures) with second base station 105-c. More specifically, by spatially multiplexing uplink channels 305-a and 305-b, UE 115-b may, at the same time, transmit spatially multiplexed transmissions of a first uplink channel 305-a (e.g., including PUCCH/PUSCH/SRS) to first base station 105-b while also sending a second uplink channel 305-b (e.g., PRACH) to second base station 105-c. As a result, communications by UE 115-b may be seamless during handover from first base station 105-b to second base station 105-c, as there may be no interruption when switching cells.

In some examples, UE 115-b may transmit first uplink channel 305-a and second uplink channel 305-b (e.g., using multiple transmit chains at UE 115-b) to different TRPs. In some cases, the TRPs may be co-located (e.g., at the same geographic location) or non-co-located (e.g., at different geographic locations). A TRP may include a base station 105 (such as first base station 105-b and second base station 105-c), an RRH of a base station 105, a cell of a base station 105, a sector of a base station 105, or any combination thereof. As an example, UE 115-b may send a transmission using first uplink channel 305-a to a first RRH of a base station 105 (such as first base station 105-b) while simultaneously sending a transmission using second uplink channel 305-b to a second RRH of the base station 105 or another base station 105. In some examples, the RRHs of the base station 105 may include one or more low-power RRHs (e.g., where the transmission power of the low-power RRH is relatively lower than that of the base station 105 and may be associated with a small cell as described herein with reference to FIG. 1), one or more high-power RRHs (e.g., where the transmission power of the high-power RRH may be similar to that of the base station 105 and may be associated with its own macro cell as described herein with reference to FIG. 1), or any combination thereof. In other examples, the geographic coverage area 110 for each base station 105 may include multiple sectors. For instance, a first geographic coverage area 110-b for first base station 105-b may include multiple sectors. In such cases, UE 115-b may transmit first uplink channel 305-a and second uplink channel to different sectors of first geographic coverage area 110-b. Additionally or alternatively, UE 115-b may transmit first uplink channel 305-a to a sector of first geographic coverage area 110-b while simultaneously transmitting second uplink channel 305-b to a sector of second geographic coverage area 110-c for second base station 105-c.

In some cases, first uplink channel 305-a and second uplink channel 305-b may include transmissions of PUCCH from UE 115-b, and each PUCCH transmission may target a different TRP. In such cases, each PUCCH may include HARQ feedback (e.g., providing acknowledgment (ACK)/negative acknowledgment (NACK) information for downlink transmissions sent to UE 115-b). For instance, when UE 115-b communicates with multiple TRPs (such as first base station 105-b and/or second base station 105-c, an RRH, sector, or cell of a base station 105, etc.), the multiple TRPs may each transmit a respective PDSCH to UE 115-b. As such, UE 115-b may simultaneously feedback ACK/NACK information for each TRP using first uplink channel 305-a and second uplink channel 305-b. In some examples, such HARQ feedback techniques may be used in cases where multiple TRPs are connected by a non-ideal backhaul (e.g., having large latency in a backhaul link 315). As such, the TRPs may not be able to dynamically exchange the ACK/NACK information, and UE 115-b may transmit separate PUCCHs with corresponding ACK/NACK information to each TRP. The described techniques may enable UE 115-b to feedback the ACK/NACK information simultaneously via different antennas 303 to the multiple TRPs. In some cases, the ACK/NACK feedback may be transmitted by UE 115-b in first uplink channel 305-a. For example, UE 115-b may include ACK/NACK feedback in the transmission of first uplink channel 305-a (e.g., a PUCCH) to a first TRP, whereas the transmission of second uplink channel 305-b may include, for example, PUSCH. In such cases, each uplink channel 305 may include signaling that is intended for respective TRPs that are expecting the transmitted signal. Such techniques may avoid cases where a TRP receives additional, unexpected, information on an uplink channel 305 sent by UE 115-b (e.g., such as in cases of a non-ideal backhaul link between multiple TRPs and a particular channel may include additional "piggybacked" signaling). In some cases, the ACK/NACK information may be transmitted via different frequency/code domain resources. Further, other types of simultaneous transmissions using first uplink channel 305-a and second uplink channel 305-b to different TRPs not explicitly described herein are also considered.

The spatially-multiplexed first uplink channel 305-a and second uplink channel 305-b may be quasi co-located (QCLed) with the same downlink signals (e.g., reference signals) or QCLed with different downlink signals. A quasi co-location (QCL) relationship between one or more transmissions or signals may refer to a spatial relationship between the antenna ports (and the corresponding signaling beams) of the respective transmissions. For example, one or more antenna ports may be implemented by base station 105-b for transmitting at least one or more reference signals and command information transmissions to UE 115-b. However, the channel properties of the signals sent via the different antenna ports may be interpreted (e.g., by a receiving device) to be the same (e.g., despite the signals being transmitted from different antenna ports), and the antenna ports (and the respective beams) may be determined to be QCLed. In such cases, UE 115-b may have respective antenna ports for receive beams used for receiving the QCLed transmissions (e.g., the reference signal). In some cases, QCLed signals may enable UE 115-b to derive the properties of a first channel (e.g., delay spread, Doppler spread, frequency shift, average power, etc.) transmitted on a first antenna port from measurements made on a second channel transmitted on a second antenna port.

First uplink channel 305-a and second uplink channel 305-b may be used for different services supported by UE 115-b. For example, UE 115-b may be capable of communicating using different services, such as eMBB, URLLC, or the like, to the same or to different TRPs. As such, UE 115-b may communicate using first uplink channel 305-*a* in accordance with a first service (e.g., eMBB) while simultaneously communicating using second uplink channel 305-*b* in accordance with a second service (e.g., URLLC). Further, different types of information may be sent using the respective uplink channels 305. For instance, first uplink channel 305-*a* may be used to transmit PUCCH for URLLC services while second uplink channel 305-*b* may be used to transmit PUSCH for eMBB services. In other examples, grant-free and grant-based transmissions may be transmitted simultaneously using the spatial multiplexing of the uplink channels 305. In such cases, a grant-free PUSCH (e.g., transmitted according to autonomous uplink techniques or according to a semi-static configuration) may be transmitted using first uplink channel 305-*a* and a grant-based PUSCH may be transmitted using second uplink channel 305-*b*. That is, independent scheduling of the different uplink channels 305 may be used. In such cases, first uplink channel 305-*a* be a dynamically scheduled uplink transmission whereas second uplink channel 305-*b* may be an RRC-configured uplink transmission, or vice versa. It is noted that other channels, services, signals, or combinations thereof, not explicitly described herein may be simultaneously transmitted using the uplink channels 305-*a* and 305-*b* and the examples described herein are provided for illustrative clarity. Further, transmission schemes where uplink channels 305-*a* and 305-*b* are used for different services may apply to different deployment scenarios, such as when UE 115-*b* is in communication with a single TRP (such as described above with reference to FIG. 2).

In some cases, first base station 105-*b* and second base station 105-*c* may coordinate the receipt of spatially multiplexed transmissions from UE 115-*b*. For example, first base station 105-*b* and second base station 105-*c* may cooperate over a backhaul link 315, which may provide, for example PRACH detection and data decoding. The base stations 105 may exchange information related to the spatial multiplexing configuration, including spatial parameters, such as the indication of a set of antenna ports, a number of layers, spatial domain precoders, etc.

Additionally, or alternatively, first base station 105-*b* and second base station 105-*c* may refrain from coordination. In such cases, multiple uplink transmissions may be transparent to first base station 105-*b* and second base station 105-*c*. Thus, first base station 105-*b* may treat second uplink channel 305-*b* for second base station 105-*c* (e.g., PRACH) as unknown interference. Likewise, second base station 105-*c* may treat first uplink channel 305-*a* (e.g., PUSCH/PUCCH/SRS) for first base station 105-*b* as interference.

Figure 4A:
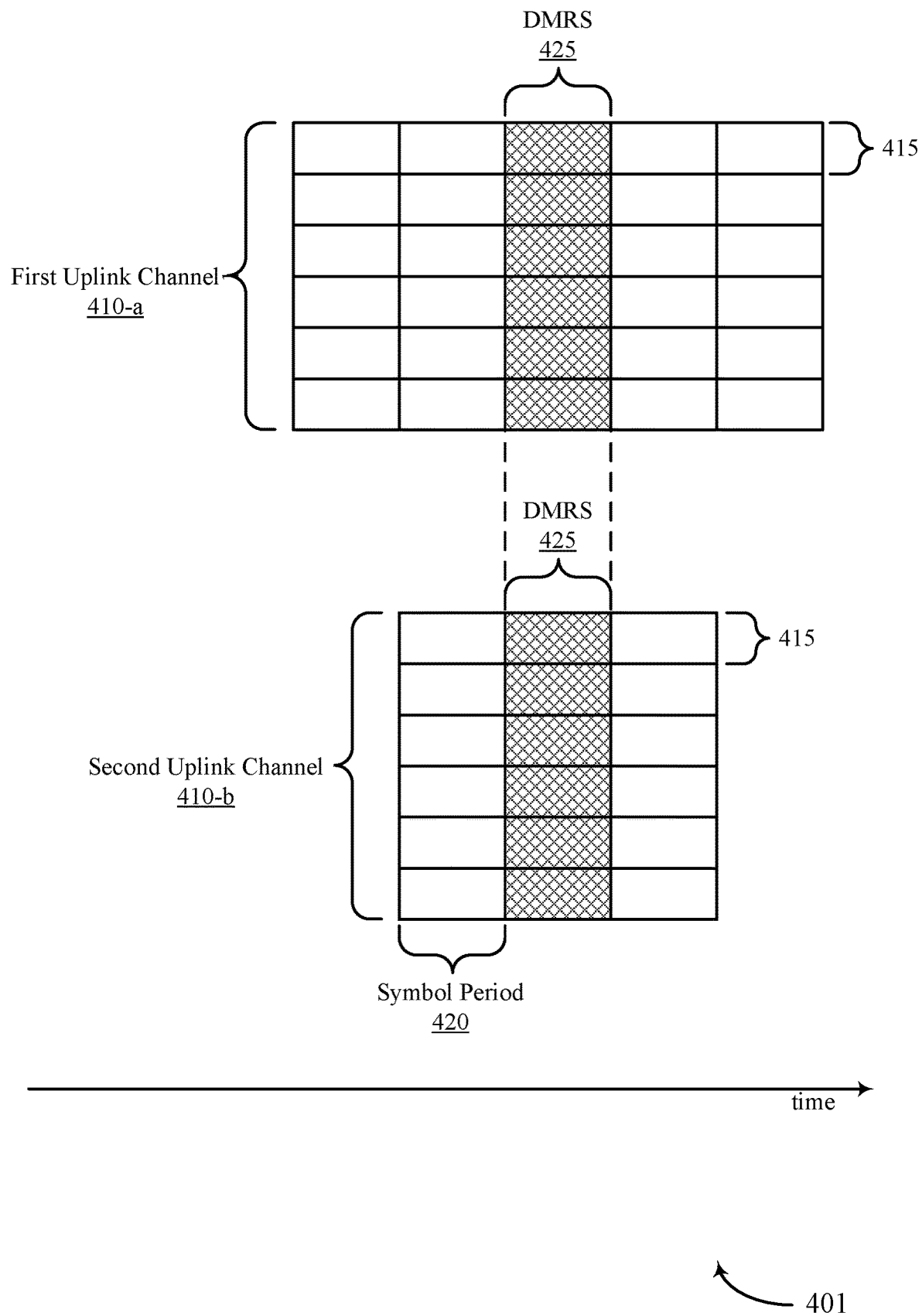
FIGS. 4A and 4B illustrate examples of a reference signal alignment that supports simultaneous uplink transmissions using spatial multiplexing in accordance with aspects of the present disclosure.
Figure 4B:
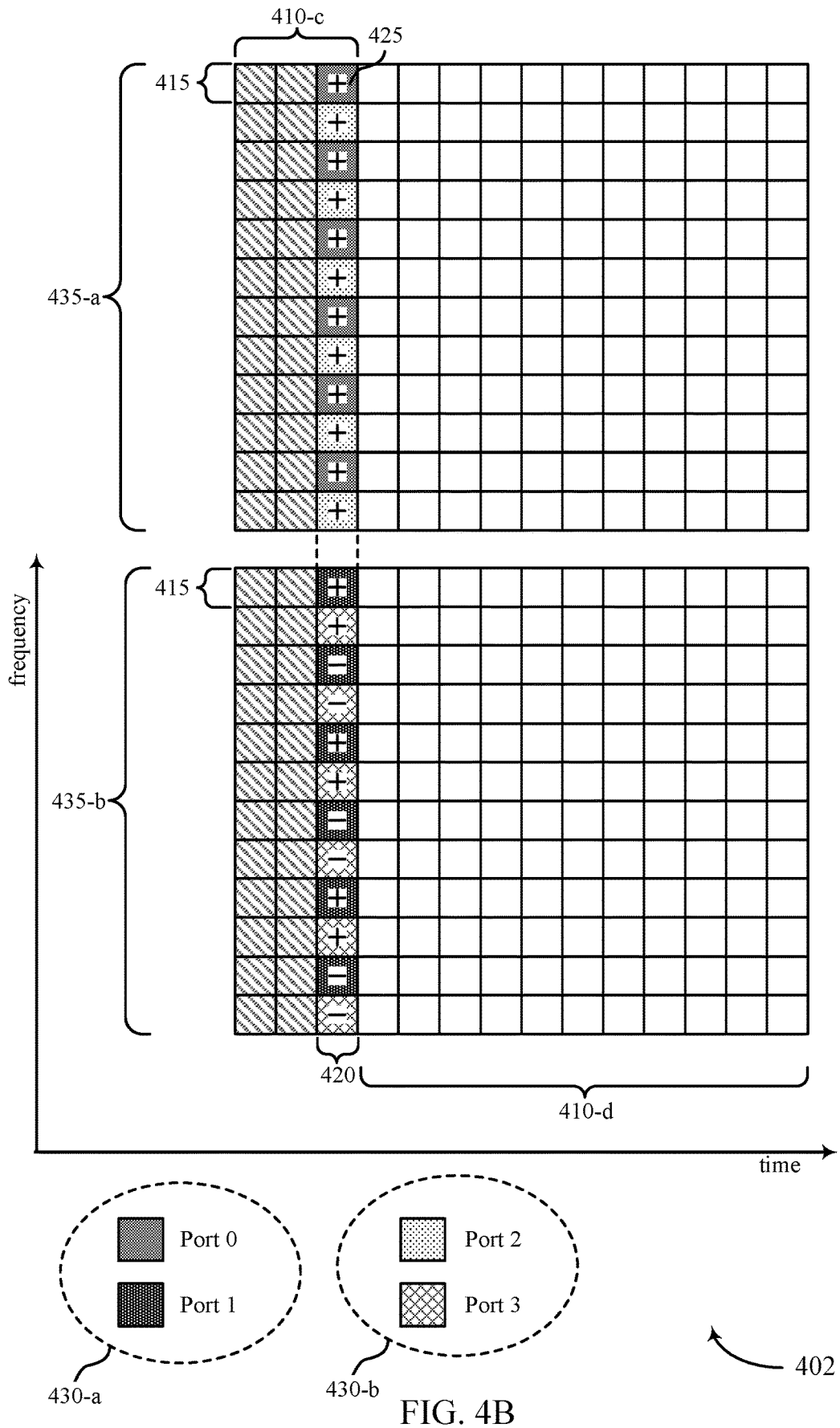

FIGS. 4A and 4B illustrate examples of reference signal alignment 401 and 402 that supports simultaneous uplink transmissions using spatial multiplexing in accordance with aspects of the present disclosure. In some examples, reference signal alignment 401 and 402 may implement aspects of wireless communications system 100. For example, a UE 115 may use techniques including aspects of reference signal alignment 401 and 402 for the simultaneous transmission of uplink channels. In some cases, reference signal alignment 401 and 402 may illustrate the alignment of reference signals, such as a DMRS, across multiple channels transmitted simultaneously.

Because different uplink channels may have different starting locations and different lengths, certain multiplexing schemes (e.g., multiplexing the multiple uplink channels without an alignment of DMRS) may result in respective uplink channels that include the DMRS in different OFDM symbols. Without an alignment of DMRS, DMRS may be transmitted at any location, which, in turn, may collide with data in another simultaneously-transmitted uplink channel, impacting channel estimation at a receiving device. Thus, to enable accurate channel estimation at the receiving device, an alignment of reference signals may be performed when the uplink channels are transmitted simultaneously.

Reference signal alignment 401 may include a first uplink channel 410-*a* and a second, different, uplink channel 410-*b*, which may be transmitted on a same set of resources. As an example, first uplink channel 410-*a* may include PUCCH and second uplink channel 410-*b* may include PUSCH. The uplink channels 410 may be spatially multiplexed on a same set of time/frequency resources within a CC, which may include multiple frequency tones 415 over a quantity of symbol periods 420 (e.g., OFDM symbol periods).

As illustrated in FIG. 4A, first uplink channel 410-*a* may be of a different length (e.g., occupy a different number of symbol periods 420) than second uplink channel 410-*b*. Additionally or alternatively, first uplink channel 410-*a* may have a different starting point (e.g., in time) than second uplink channel 410-*b*. To ensure efficient channel estimation, first uplink channel 410-*a* and second uplink channel 410-*b* (e.g., including PUCCH and PUSCH, respectively) may be simultaneously transmitted with orthogonal DMRSs 425 in the same symbol period 420 (i.e., to align the DMRSs 425), which may provide accurate channel estimation at a receiving device for the simultaneously transmitted signals. As illustrated, the DMRSs 425 for first uplink channel 410-*a* and second uplink channel 410-*b* may be transmitted in a same symbol period. While the DMRSs 425 are illustrated in a temporally third symbol period 420 of first uplink channel 410-*a*, the alignment of the DMRSs 425 may be at any symbol period 420 when first uplink channel 410-*a* and second uplink channel 410-*b* are transmitted simultaneously.

In another example, reference signal alignment 402 may include a first data stream 435-*a* and a second data stream 435-*b* transmitted on a same set of resources. Reference signal alignment 402 may further include a first uplink channel 410-*c* and a second, different, uplink channel 410-*d*. As an example, first uplink channel 410-*c* may include PUCCH and second uplink channel 410-*d* may include PUSCH, where the uplink channels 410 may be spatially multiplexed on a same set of time/frequency resources within a CC. The CC may include multiple frequency tones 415 over a number of symbol periods 420 (e.g., OFDM symbol periods).

As illustrated in FIG. 4B, in some cases, DMRS 425 for first uplink channel 410-*c* may occupy different frequency tones 415 than DMRS 425 for second uplink channel 410-*d*. Accordingly, first uplink channel 410-*a* and second uplink channel 410-*d* may use different DMRS groups 430. As an example, there may be a one-to-one correspondence between a DMRSs 425 and the antenna port used for transmitting DMRS 425. As DMRSs 425 for both first uplink channel 410-*c* and second uplink channel 410-*d* may be transmitted during the same symbol period 420, DMRSs 425 may be transmitted using different antenna ports (e.g., Ports 0 through 3), and first uplink channel 410-*c* and second uplink channel 410-*d* may each be allocated, for example, two ports each. In such cases, the use of different DMRS groups 430 may ensure that there is a particular combination of antenna ports used for the transmission of multiple DMRSs 425 for each of PUCCH and PUSCH. In the present example, four antenna ports may be used for DMRS, where two ports may be configured into a first DMRS group 430-*a* (e.g., including Port 0 and Port 1) and two ports may be configured into a second DMRS group 430-*b* (e.g., including Port 2 and Port 3). As a result of the different DMRS groups 430 for transmitting DMRS 425, the DMRS 425 for different uplink channels 410 may occupy different frequency tones 415.

In some examples, DMRS and data may be TDM-ed for both PUSCH and PUCCH (e.g., Format 3 and Format 4) such that data and the DMRS 425 may not be multiplexed on the same symbol period 420. In some examples, first DMRS group 430-a and second DMRS group 430-b may be configured, for example, through RRC signaling and/or DCI as part of a spatial multiplexing configuration. That is, a base station 105 may configure the DMRS 425 for different antenna ports, and indicate which ports may be used for DMRS 425 associated with first uplink channel 410-a and 410-c and second uplink channel 410-b and 410-d.

In other examples, such as the simultaneous transmission of PUSCH/PUCCH and SRS, SRS may occupy the same symbol period 420 as data (i.e., SRS may be transmitted with data). Additionally or alternatively, SRS may be transmitted in the same symbol period 420 as DMRS 425 (i.e., SRS may be transmitted with DMRS 425). In such cases, the SRS and DMRS 425 may be FDM-ed (i.e., the SRS and DMRS 425 may occupy different frequency tones in the same OFDM symbol period 420) to ensure correct channel estimation.

Figure 5:
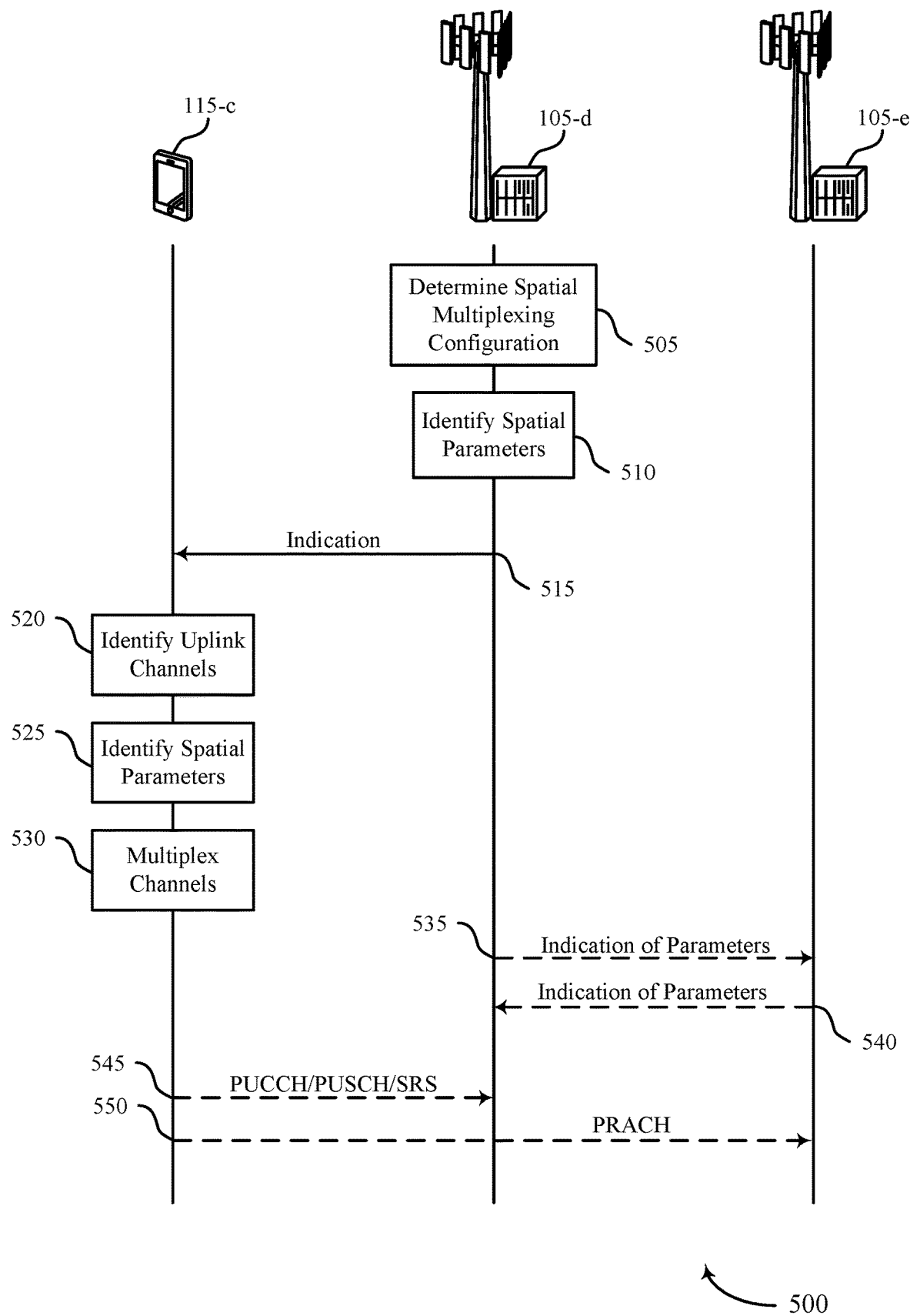
FIG. 5 illustrates an example of a process flow in a system that supports simultaneous uplink transmissions using spatial multiplexing in accordance with aspects of the present disclosure.

FIG. 5 illustrates an example of a process flow 500 in a system that supports simultaneous uplink transmissions using spatial multiplexing in accordance with aspects of the present disclosure. In some examples, process flow 500 may implement aspects of wireless communications system 100. For example, process flow 500 may include UE 115-c and one or more base stations 105 (e.g., a first base station 105-d and a second base station 105-e), which may be examples of the corresponding devices described with reference to FIGS. 1-3. Process flow 500 may illustrate the use of SDM for simultaneous uplink transmissions to enable collision-free uplink communications.

At 505, first base station 105-d may determine a spatial multiplexing configuration for UE 115-c to use for simultaneous transmissions of two or more uplink channels on a CC via spatial multiplexing. In some cases, the two or more uplink channels may include a PUCCH, a PUSCH, a PRACH, an SRS, and the like.

At 510, first base station 105-d may identify multiple sets of spatial parameters for at least a first uplink channel and a second uplink channel of the two or more uplink channels based on the spatial multiplexing configuration. In some cases, each set of spatial parameters from the multiple sets of spatial parameters may be applied to a respective uplink channel spatially multiplexed by UE 115-c.

At 515, first base station 105-d may transmit, and UE 115-c may receive, an indication of the spatial multiplexing configuration and the multiple sets of spatial parameters. In some cases, the indication of the set of spatial parameters may be sent via RRC signaling, or DCI, or a combination thereof. In some aspects, spatial parameters for a certain uplink channel may be received via RRC signaling whereas spatial parameters for another uplink channel may be received via DCI.

At 520, UE 115-c may identify, from the two or more uplink channels, the first uplink channel and the second uplink channel for transmission on a CC. In some cases, the first uplink channel and the second uplink channel may be of different types. For example, the first uplink channel or the second uplink channel may respectively include PUCCH/PUSCH, PRACH, or SRS. Additionally or alternatively, the first uplink channel and the second uplink channel may be the same type of channel. For example, the first uplink channel may be a PUCCH communication transmitted to a first TRP, and the second uplink channel may be another PUCCH communication transmitted to a second, different, TRP.

At 525, UE 115-c may identify multiple sets of spatial parameters for the simultaneous transmission of the first uplink channel and the second uplink channel. For example, the spatial multiplexing configuration may include an indication of the multiple sets of spatial parameters for respective uplink channels. In some examples, each set of spatial parameters from the multiple sets of spatial parameters may be applied to a respective uplink channel when being transmitted. In some cases, each set of spatial parameters includes an indication of a set of antenna ports, a number of layers, spatial domain precoders, or a combination thereof.

In some examples, UE 115-c may identify an alignment of respective DMRSs for the first uplink channel and the second uplink channel based on the spatial multiplexing configuration, for example, as described herein with reference to FIG. 4A. In such cases, the first uplink channel and the second uplink channel may have different lengths. For instance, the first uplink channel may include PUCCH and the second uplink channel may include PUSCH. However, other types of channels are possible that may have different lengths, or may utilize the alignment of DMRS. The alignment may be indicated to UE 115-c as part of the spatial multiplexing configuration. At 530, UE 115-c may spatially multiplex the first uplink channel and the second uplink channel on a set of resources of the CC in accordance with the spatial multiplexing configuration.

In some cases, first base station 105-d and second base station 105-e may cooperate in sharing information regarding the spatially multiplexed uplink channels. For example, at 535, first base station 105-d may optionally transmit (e.g., over a backhaul link) an indication of the multiple sets of spatial parameters to a second base station 105-e. Additionally or alternatively, at 540, second base station 105-e may optionally provide, to first base station 105-d, an indication of multiple sets of spatial parameters (e.g., for another UE 115 that may be sending a PRACH to first base station 105-d).

However, the exchanged information for coordination of spatial parameters for PRACH detection and data decoding may be optional, and first base station 105-d and second base station 105-e may, in some examples, refrain from exchanging such information. In such cases, should UE 115-c direct the spatially multiplexed uplink channels to both first base station 105-d and second base station 105-e, each base station 105 may treat the signal intended for the other base station 105 as interference. More specifically, first base station 105-d may receive PUCCH/PUSCH from UE 115-c and treat the simultaneous transmission of PRACH directed to second base station 105-e as interference. Likewise, second base station may treat the PUCCH/PUSCH transmission as interference when simultaneously receiving the PRACH from UE 115-c. In some aspects, UE 115-c may use different beamforming schemes or spatial precoders for the different uplink channels to guarantee that, in the received signal at each base station 105, the intended signal (i.e., the signal intended for a particular base station 105) has a stronger power than the unintended signal (i.e., the signal intended for another base station 105).

At 545 and/or 550, UE 115-a may simultaneously transmit the spatially multiplexed first uplink channel and second uplink channel on the set of resources. In some examples, the spatially multiplexed first uplink channel and second uplink channel may be sent to the same base station 105 or to different base stations 105. In a first illustrative example, at 545, UE 115-*c* may transmit multiple uplink channels including PUCCH, PUSCH, or SRS to first base station 105-*d*. In this example, a first uplink channel may include PUCCH and/or PUSCH, while a second uplink channel including an SRS that is spatially multiplexed with the first uplink channel may be simultaneously transmitted to base station 105-*d*. In a second illustrative example, at 545, UE 115-*c* may transmit a first uplink channel to first base station 105-*d* that includes PUCCH and/or PUSCH, and at 550 UE 115-*c* may also simultaneously transmit (e.g., using SDM on a same set of resources) a second uplink channel including PRACH to second base station 105-*e*. In some examples, the exchange of the sets of spatial parameters between first base station 105-*d* and second base station 105-*e* described herein (e.g., at 535/540) may assist second base station 105-*e* in receiving the PRACH transmission at 550. For example, because each set of spatial parameters from the multiple sets of spatial parameters may be applied to a respective uplink channel, second base station 105-*e* may be aware of the spatial parameters being used for the PRACH transmission (e.g., even though the spatial parameters were generated by first base station 105-*d*).

In some cases, such as when the first uplink channel includes PUCCH and the second uplink channel includes PUSCH, a first DMRS may be transmitted in the first uplink channel and a second DMRS may be transmitted in the second uplink channel when the simultaneous transmission of the spatially multiplexed first and second uplink channels is sent. In some examples, the first DMRS and the second DMRS are transmitted within a same OFDM symbol period in accordance with the identified alignment. In some cases, the first DMRS may be TDM-ed with data in the first uplink channel and the second DMRS may be TDM-ed with data in the second uplink channel.

In another example, the first uplink channel may include SRS and the second uplink channel may include PUCCH/PUSCH. In such cases, UE 115-*c* may transmit, with the spatially multiplexed first uplink channel and second uplink channel on the set of resources, the SRS and data within a same OFDM symbol period on the first uplink channel. Additionally or alternatively, UE 115-*c* may transmit, with the spatially multiplexed first uplink channel and second uplink channel on the set of resources, the SRS and a DMRS within a OFDM symbol period on the first uplink channel. In some examples, the DMRS may be associated with the PUCCH, or the PUSCH, or a combination thereof, and the SRS and the DMRS may also be FDM-ed (i.e., the SRS and DMRS may occupy different frequency tones).

UE 115-*c* may also apply different power control to the simultaneous transmission of the spatially multiplexed channels. For example, UE 115-*c* may identify a power control configuration in combination with the spatial multiplexing configuration. In such cases, UE 115-*c* may determine that the first uplink channel includes an SRS and the second uplink channel includes PUCCH and/or PUSCH and determine that a transmit power for the SRS may be de-boosted. Although the spatial multiplexing and transmission of two uplink channels are described herein as examples, any number of uplink channels may be transmitted using SDM and two uplink channels are described for brevity. Accordingly, the techniques used for spatially multiplexing two uplink channels may be extended to more than two uplink channels.

Figure 6:
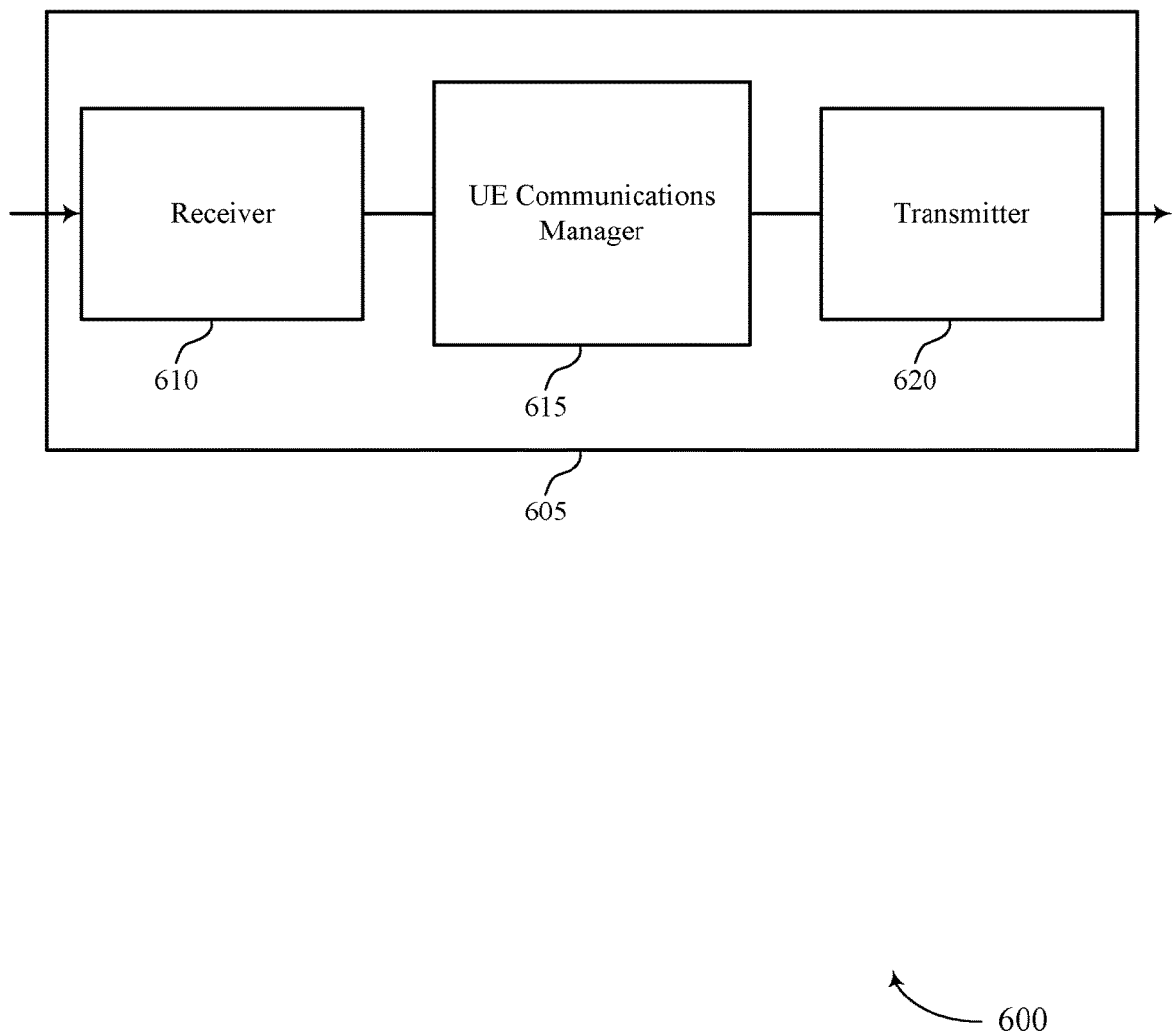
FIGS. 6 through 8 show block diagrams of a device that supports simultaneous uplink transmissions using spatial multiplexing in accordance with aspects of the present disclosure.

FIG. 6 shows a block diagram 600 of a wireless device 605 that supports simultaneous uplink transmissions using spatial multiplexing in accordance with aspects of the present disclosure. Wireless device 605 may be an example of aspects of a UE 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to simultaneous uplink transmissions using spatial multiplexing, etc.). Information may be passed on to other components of the device. The receiver 610 may be an example of aspects of the transceiver 935 described with reference to FIG. 9. The receiver 610 may utilize a single antenna or a set of antennas.

UE communications manager 615 may be an example of aspects of the UE communications manager 915 described with reference to FIG. 9. UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described in the present disclosure.

The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an input/output (I/O) component, a transceiver, a network server, another computing device, one or more other components described in the present disclosure, or a combination thereof in accordance with various aspects of the present disclosure.

UE communications manager 615 may receive, from a base station 105, an indication of a spatial multiplexing configuration for transmitting two or more uplink channels, identify, from the two or more uplink channels, a first uplink channel and a second uplink channel for transmission on a component carrier, the first uplink channel and the second uplink channel being of different types, spatially multiplex the first uplink channel and the second uplink channel on a set of resources of the component carrier in accordance with the spatial multiplexing configuration, and simultaneously transmit the spatially multiplexed first uplink channel and second uplink channel on the set of resources.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
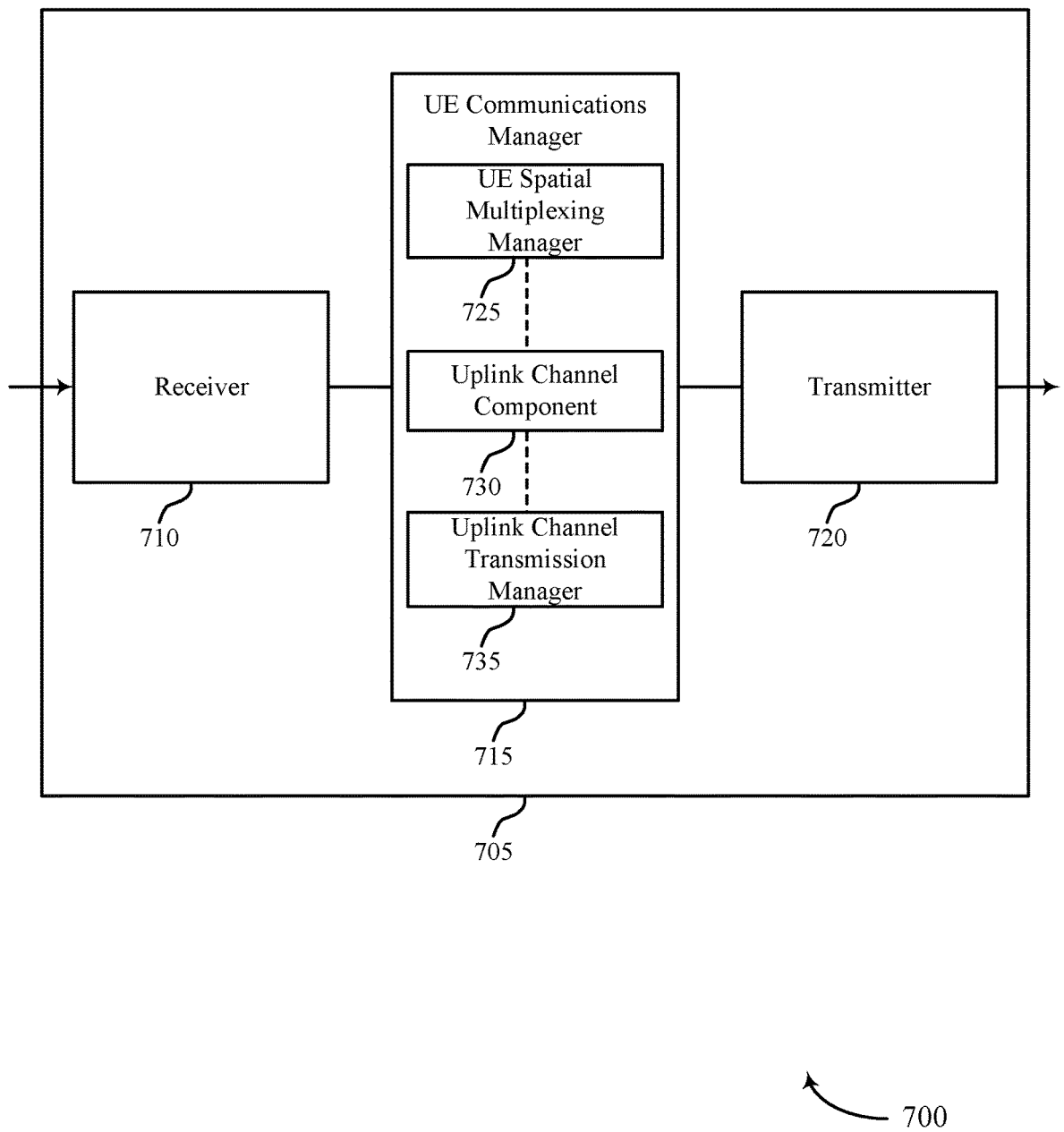

FIG. 7 shows a block diagram 700 of a wireless device 705 that supports simultaneous uplink transmissions using spatial multiplexing in accordance with aspects of the present disclosure. Wireless device 705 may be an example of aspects of a wireless device 605 or a UE 115 as described with reference to FIG. 6. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to simultaneous uplink transmissions using spatial multiplexing, etc.). Information may be passed on to other components of the device. The receiver 710 may be an example of aspects of the transceiver 935 described with reference to FIG. 9. The receiver 710 may utilize a single antenna or a set of antennas.

UE communications manager 715 may be an example of aspects of the UE communications manager 915 described with reference to FIG. 9. UE communications manager 715 may also include UE spatial multiplexing manager 725, uplink channel component 730, and uplink channel transmission manager 735.

UE spatial multiplexing manager 725 may receive, from a base station, an indication of a spatial multiplexing configuration for transmitting two or more uplink channels. In some examples, UE spatial multiplexing manager 725 may spatially multiplex the first uplink channel and the second uplink channel on a set of resources of the component carrier in accordance with the spatial multiplexing configuration. In some cases, the two or more uplink channels include at least a PUCCH, a PUSCH, a PRACH, and an SRS.

Uplink channel component 730 may identify, from the two or more uplink channels, a first uplink channel and a second uplink channel for transmission on a component carrier, the first uplink channel and the second uplink channel being of different types. In some cases, the first uplink channel includes an SRS and the second uplink channel includes a PUCCH, or a PUSCH, or a combination thereof.

Uplink channel transmission manager 735 may simultaneously transmit the spatially multiplexed first uplink channel and second uplink channel on the set of resources. In some examples, uplink channel transmission manager 735 may transmit, with the spatially multiplexed first uplink channel and second uplink channel on the set of resources, the SRS and data within a same OFDM symbol period on the first uplink channel. In some examples, uplink channel transmission manager 735 may transmit, with the spatially multiplexed first uplink channel and second uplink channel on the set of resources, the SRS and a DMRS within a same OFDM symbol period on the first uplink channel, the DMRS being associated with the PUCCH, or the PUSCH, or a combination thereof, where the SRS and the DMRS are frequency division multiplexed. Additionally or alternatively, uplink channel transmission manager 735 may transmit the second uplink channel to a different base station 105. In some cases, simultaneously transmitting the spatially multiplexed first uplink channel and second uplink channel includes transmitting the first uplink channel to the base station 105.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
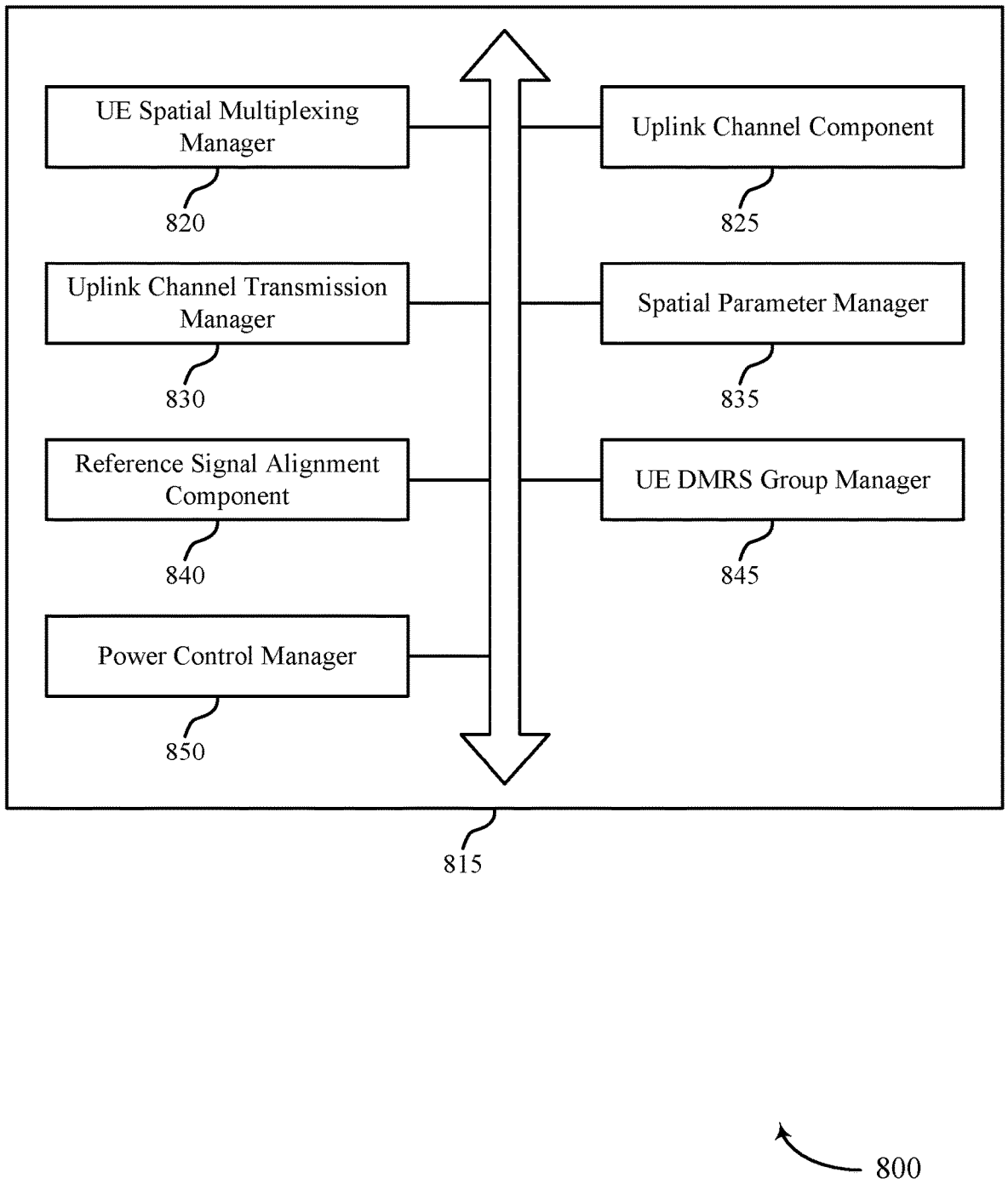

FIG. 8 shows a block diagram 800 of a UE communications manager 815 that supports simultaneous uplink transmissions using spatial multiplexing in accordance with aspects of the present disclosure. The UE communications manager 815 may be an example of aspects of a UE communications manager 615, a UE communications manager 715, or a UE communications manager 915 described with reference to FIGS. 6, 7, and 9. The UE communications manager 815 may include UE spatial multiplexing manager 820, uplink channel component 825, uplink channel transmission manager 830, spatial parameter manager 835, reference signal alignment component 840, UE DMRS group manager 845, and power control manager 850. Each of these modules may communicate, directly or indirectly, with one another (e.g., via one or more buses).

UE spatial multiplexing manager 820 may receive (e.g., from a base station 105) an indication of a spatial multiplexing configuration for transmitting two or more uplink channels and spatially multiplex the first uplink channel and the second uplink channel on a set of resources of the component carrier in accordance with the spatial multiplexing configuration. In some cases, the two or more uplink channels include at least a PUCCH, a PUSCH, a PRACH, and an SRS.

Uplink channel component 825 may identify, from the two or more uplink channels, a first uplink channel and a second uplink channel for transmission on a component carrier, the first uplink channel and the second uplink channel being of different types. In some cases, the first uplink channel includes an SRS and the second uplink channel includes a PUCCH, or a PUSCH, or a combination thereof.

Uplink channel transmission manager 830 may simultaneously transmit the spatially multiplexed first uplink channel and second uplink channel on the set of resources. In some examples, uplink channel transmission manager 830 may transmit, with the spatially multiplexed first uplink channel and second uplink channel on the set of resources, the SRS and data within a same OFDM symbol period on the first uplink channel. Additionally or alternatively, uplink channel transmission manager 830 may transmit, with the spatially multiplexed first uplink channel and second uplink channel on the set of resources, the SRS and a DMRS within a same OFDM symbol period on the first uplink channel, the DMRS being associated with the PUCCH, or the PUSCH, or a combination thereof, where the SRS and the DMRS are frequency division multiplexed. In some examples, uplink channel transmission manager 830 may transmit the second uplink channel to a different base station 105. In some examples, the first uplink channel is a dynamically scheduled uplink transmission and the second uplink channel is an uplink transmission configured via RRC messaging.

In some cases, simultaneously transmitting the spatially multiplexed first uplink channel and second uplink channel includes transmitting the first uplink channel to the base station. In some cases, simultaneously transmitting the spatially multiplexed first uplink channel and second uplink channel includes transmitting the first uplink channel to a first TRP and transmitting the second uplink channel to a different TRP. In some examples, the first TRP, or the different TRP, or both, include a base station 105, an RRH, a cell of the base station 105, a sector of the base station 105, or a combination thereof. In some examples, the first uplink channel includes a first PUCCH and the second uplink channel includes a second PUCCH different from the first PUCCH. In some cases, the first PUCCH includes first HARQ feedback transmitted to the first TRP and the second PUCCH includes second HARQ feedback transmitted to the second TRP.

In some cases, the first uplink channel is QCLed with a first set of downlink reference signals and the second uplink channel is QCLed with a second set of downlink reference signals different from the first set of downlink reference signals. Additionally or alternatively, the spatially multiplexed first uplink channel and second uplink channel are QCLed with a same set of downlink reference signals. In some examples, the first uplink channel is transmitted in accordance with a first service (e.g., eMBB) and the second uplink channel is transmitted in accordance with a second service (e.g., URLLC).

Spatial parameter manager 835 may identify, from the spatial multiplexing configuration, multiple sets of spatial parameters for the simultaneous transmission of the first uplink channel and the second uplink channel, where each set of spatial parameters from the multiple sets of spatial parameters is applied to a respective uplink channel. In some examples, spatial parameter manager 835 may receive, from the base station 105, an indication of the set of spatial parameters via RRC signaling, or DCI, or a combination thereof. In some cases, each set of spatial parameters includes an indication of a set of antenna ports, a number of layers, spatial domain precoders, or a combination thereof. In some cases, the first uplink channel includes a PUCCH and the second uplink channel includes a PUSCH.

Reference signal alignment component 840 may identify an alignment of respective DMRSs for the first uplink channel and the second uplink channel based on the spatial multiplexing configuration, where the first uplink channel and the second uplink channel have different lengths and different starting positions. Reference signal alignment component 840 may transmit, with the spatially multiplexed first uplink channel and second uplink channel on the set of resources, a first DMRS for the first uplink channel and a second DMRS for the second uplink channel, where the first DMRS and the second DMRS are transmitted within a same OFDM symbol period in accordance with the identified alignment.

UE DMRS group manager 845 may identify multiple set of DMRS ports based on the spatial multiplexing configuration, where a first set of DMRS ports is part of a first DMRS group associated with a first set of antenna ports and a second set of DMRS ports is part of a second DMRS group associated with a second set of antenna ports. In some cases, the first DMRS is time-division multiplexed with data in the first uplink channel and the second DMRS is time-division multiplexed with data in the second uplink channel.

Power control manager 850 may determine a power control configuration for simultaneously transmitting the spatially multiplexed first uplink channel and second uplink channel based on the spatial multiplexing configuration, where the power control configuration includes a first transmit power for the first uplink channel and a second transmit power for the second uplink channel. Power control manager 850 may determine that the first uplink channel includes an SRS and the second uplink channel includes a PUCCH, or a PUSCH, or a combination thereof, and power control manager 850 may de-boost the first transmit power based on the determination.

Figure 9:
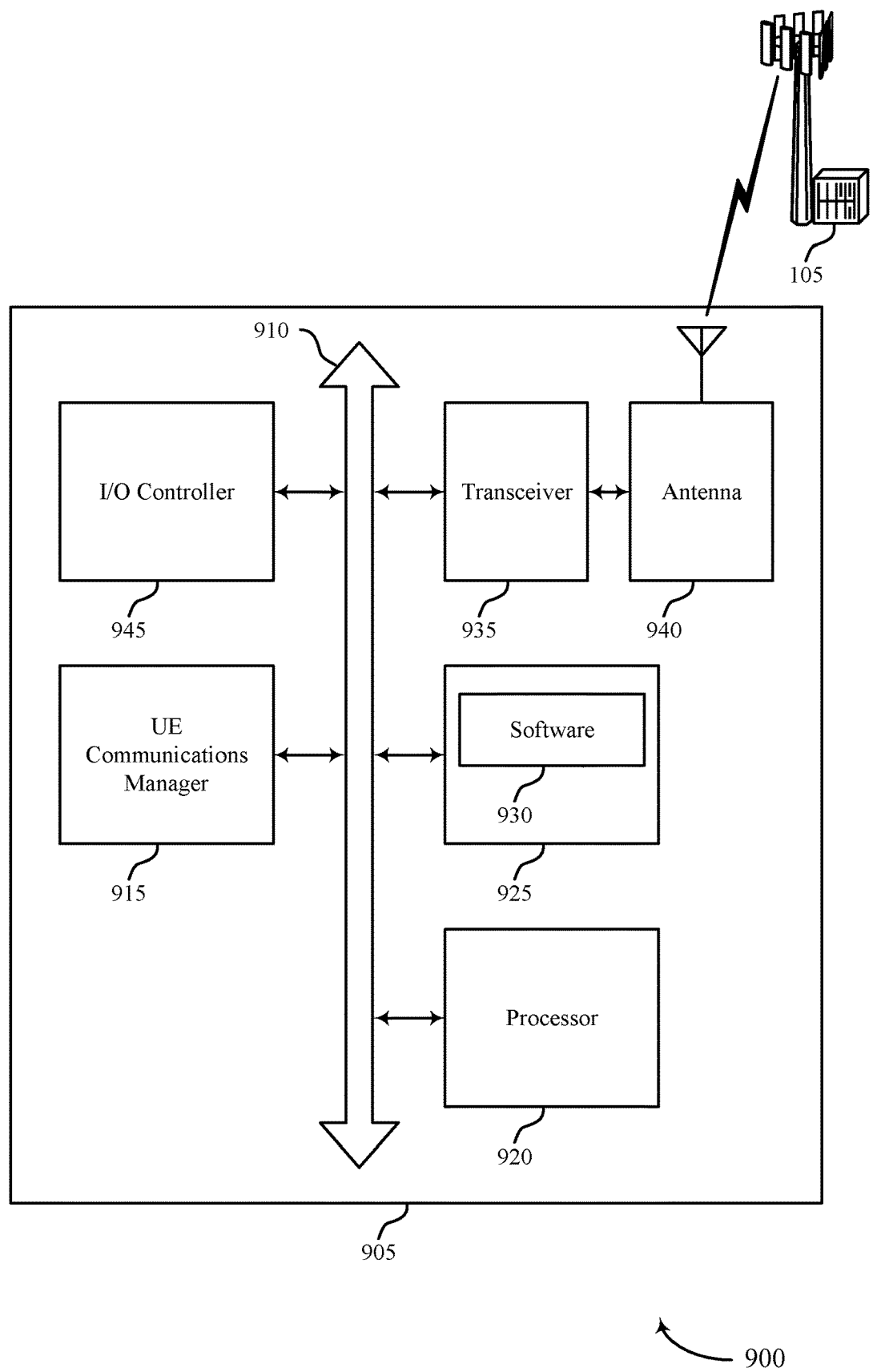
FIG. 9 illustrates a diagram of a system including a user equipment (UE) that supports simultaneous uplink transmissions using spatial multiplexing in accordance with aspects of the present disclosure.

FIG. 9 illustrates a diagram of a system 900 including a device 905 that supports simultaneous uplink transmissions using spatial multiplexing in accordance with aspects of the present disclosure. Device 905 may be an example of or include the components of wireless device 605, wireless device 705, or a UE 115 as described herein, e.g., with reference to FIGS. 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a PLD, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting simultaneous uplink transmissions using spatial multiplexing).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic I/O system (BIOS) which may control basic hardware or software operation such as the interaction with peripheral components or devices.

Software 930 may include code to implement aspects of the present disclosure, including code to support simultaneous uplink transmissions using spatial multiplexing. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described herein. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas. In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
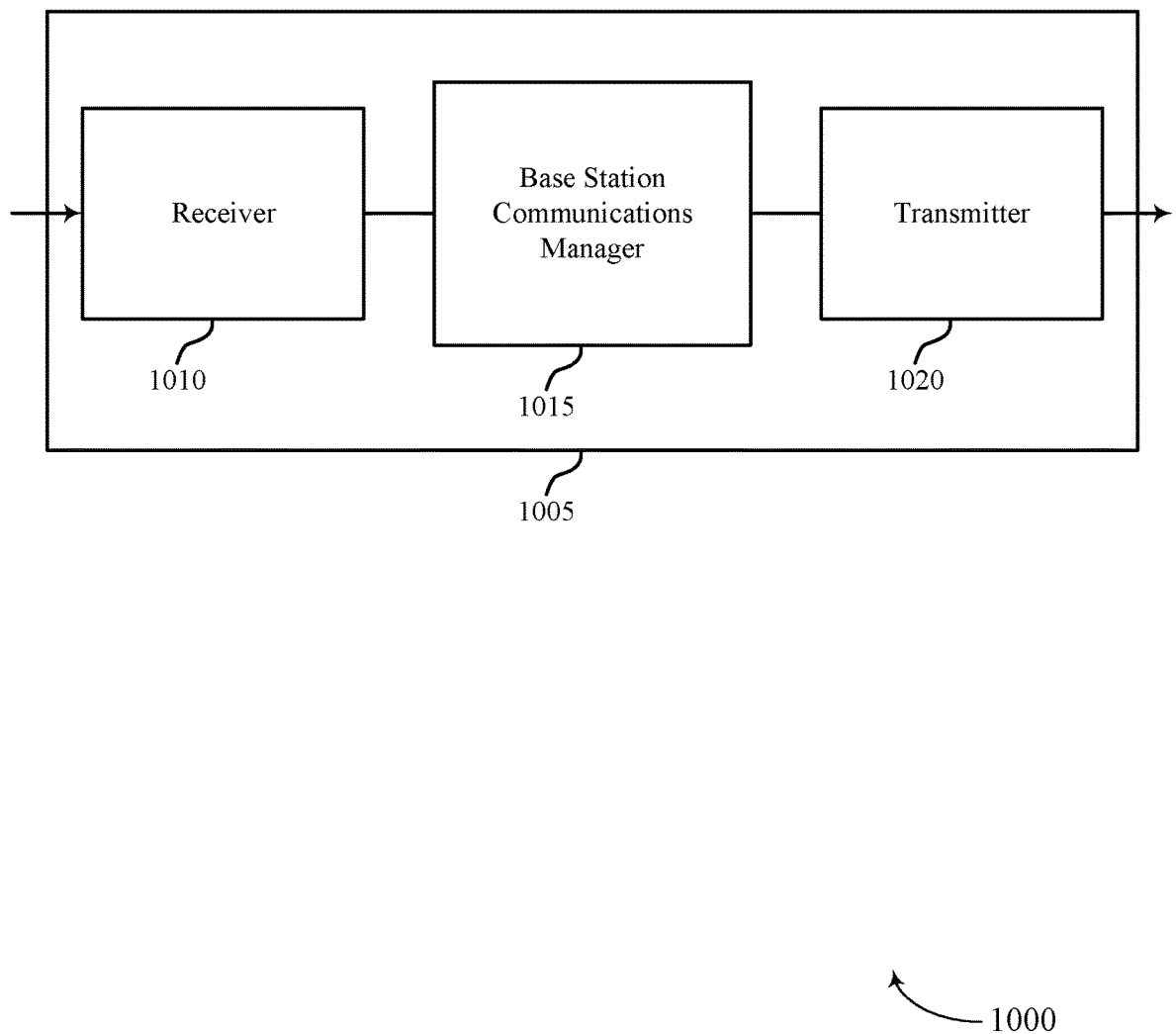
FIGS. 10 through 12 show block diagrams of a device that supports simultaneous uplink transmissions using spatial multiplexing in accordance with aspects of the present disclosure.

FIG. 10 shows a block diagram 1000 of a wireless device 1005 that supports simultaneous uplink transmissions using spatial multiplexing in accordance with aspects of the present disclosure. Wireless device 1005 may be an example of aspects of a TRP, such as a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to simultaneous uplink transmissions using spatial multiplexing, etc.). Information may be passed on to other components of the device. The receiver 1010 may be an example of aspects of the transceiver 1335 described with reference to FIG. 13. The receiver 1010 may utilize a single antenna or a set of antennas.

Base station communications manager 1015 may be an example of aspects of the base station communications manager 1315 described with reference to FIG. 13. Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a DSP, an ASIC, an FPGA or other PLD, discrete gate or transistor logic, discrete hardware components, or any combination thereof designed to perform the functions described in the present disclosure.

The base station communications manager 1015 and/or at least some of its various sub-components may be physically located at various positions, including being distributed such that portions of functions are implemented at different physical locations by one or more physical devices. In some examples, base station communications manager 1015 and/ or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may determine a spatial multiplexing configuration for a UE 115 to simultaneously transmit two or more uplink channels on a component carrier via spatial multiplexing, identify multiple sets of spatial parameters for at least a first uplink channel and a second uplink channel of the two or more uplink channels based on the spatial multiplexing configuration, where each set of spatial parameters from the multiple sets of spatial parameters is to be applied to a respective uplink channel, transmit an indication of the spatial multiplexing configuration and the multiple sets of spatial parameters to the UE 115, and receive, from the UE 115, the first uplink channel, or the second uplink channel, or a combination thereof, on a set of resources of the component carrier in accordance with each set of spatial parameters.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
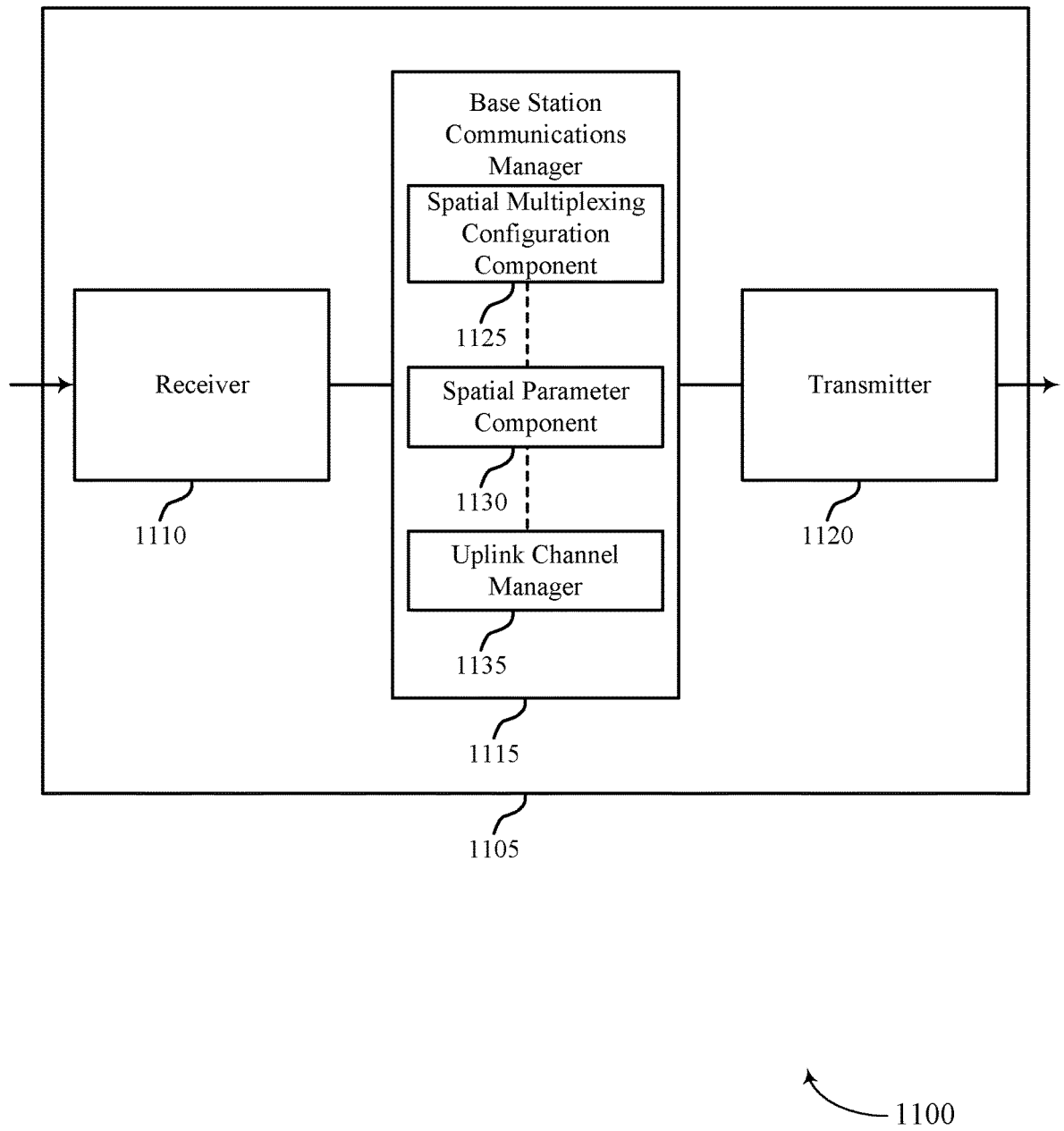

FIG. 11 shows a block diagram 1100 of a wireless device 1105 that supports simultaneous uplink transmissions using spatial multiplexing in accordance with aspects of the present disclosure. Wireless device 1105 may be an example of aspects of a wireless device 1005 or a TRP (such as a base station 105) as described with reference to FIG. 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to simultaneous uplink transmissions using spatial multiplexing, etc.). Information may be passed on to other components of the device. The receiver 1110 may be an example of aspects of the transceiver 1335 described with reference to FIG. 13. The receiver 1110 may utilize a single antenna or a set of antennas.

Base station communications manager 1115 may be an example of aspects of the base station communications manager 1315 described with reference to FIG. 13. Base station communications manager 1115 may also include spatial multiplexing configuration component 1125, spatial parameter component 1130, and uplink channel manager 1135.

Spatial multiplexing configuration component 1125 may determine a spatial multiplexing configuration for a UE 115 to simultaneously transmit two or more uplink channels on a component carrier via spatial multiplexing. In some cases, the two or more uplink channels include at least a PUCCH, a PUSCH, a PRACH, and an SRS.

Spatial parameter component 1130 may identify multiple sets of spatial parameters for at least a first uplink channel and a second uplink channel of the two or more uplink channels based on the spatial multiplexing configuration, where each set of spatial parameters from the multiple sets of spatial parameters is to be applied to a respective uplink channel and transmit an indication of the spatial multiplexing configuration and the multiple sets of spatial parameters to the UE 115. In some cases, transmitting the indication of the set of spatial parameters includes: transmitting the indication of the set of spatial parameters via RRC signaling, or DCI, or a combination thereof. In some cases, the set of spatial parameters include an indication of a set of antenna ports, a number of layers, spatial domain precoders, or a combination thereof.

Uplink channel manager 1135 may receive, from the UE 115, the first uplink channel, or the second uplink channel, or a combination thereof, on a set of resources of the component carrier in accordance with each set of spatial parameters. In some cases, the first uplink channel is received from the UE 115 and includes a PUCCH, or a PUSCH, or a combination thereof, and where a simultaneous transmission of the second uplink channel is treated as interference. In some cases, receiving the first uplink channel, or the second uplink channel, or a combination thereof includes receiving the first uplink channel, or the second uplink channel, or a combination thereof at a TRP including a base station 105, an RRH, a cell of the base station 105, a sector of the base station 105, or a combination thereof.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
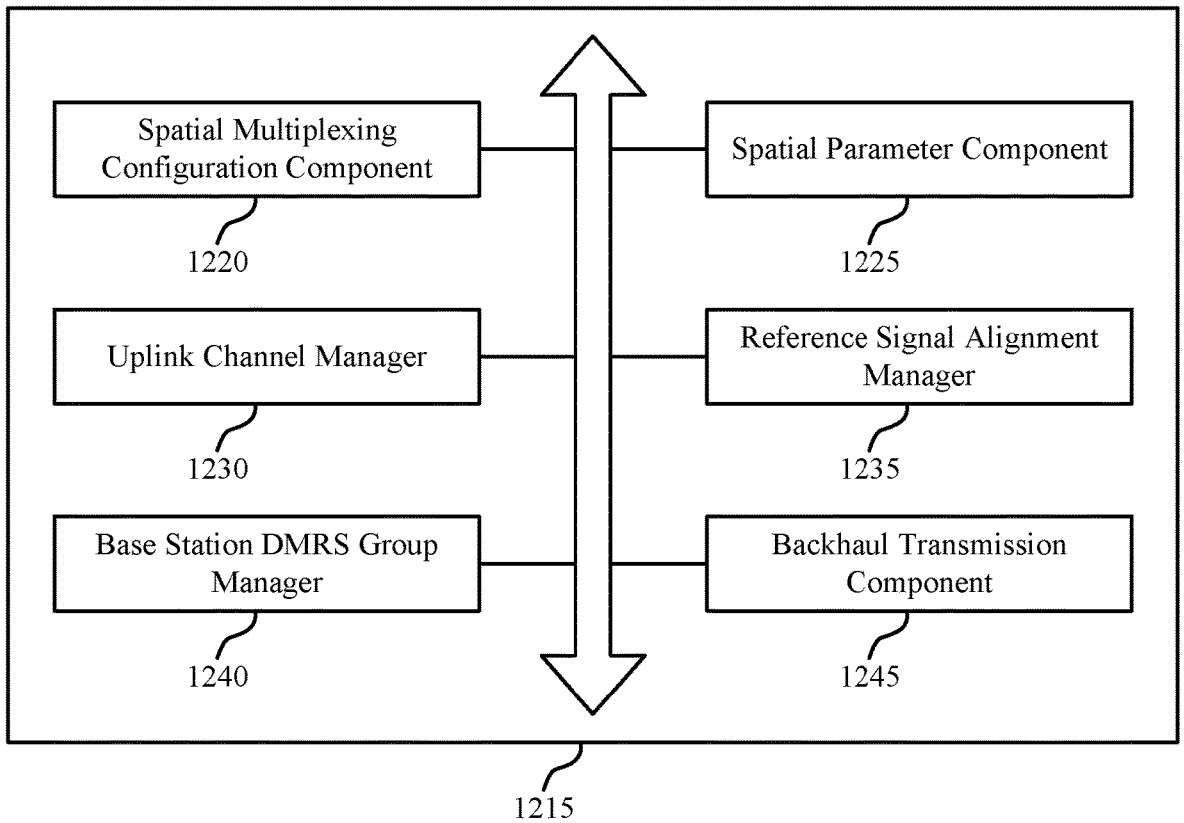

FIG. 12 shows a block diagram 1200 of a base station communications manager 1215 that supports simultaneous uplink transmissions using spatial multiplexing in accordance with aspects of the present disclosure. The base station communications manager 1215 may be an example of aspects of a base station communications manager 1315 described with reference to FIGS. 10, 11, and 13. The base station communications manager 1215 may include spatial multiplexing configuration component 1220, spatial parameter component 1225, uplink channel manager 1230, reference signal alignment manager 1235, base station DMRS group manager 1240, and backhaul transmission component 1245. Each of these modules may communicate, directly or indirectly, with one another (e.g., via one or more buses).

Spatial multiplexing configuration component 1220 may determine a spatial multiplexing configuration for a UE 115 to simultaneously transmit two or more uplink channels on a component carrier via spatial multiplexing. In some cases, the two or more uplink channels include at least a PUCCH, a PUSCH, a physical random access channel (PRACH), and an SRS.

Spatial parameter component 1225 may identify multiple sets of spatial parameters for at least a first uplink channel and a second uplink channel of the two or more uplink channels based on the spatial multiplexing configuration, where each set of spatial parameters from the multiple sets of spatial parameters is to be applied to a respective uplink channel and transmit an indication of the spatial multiplexing configuration and the multiple sets of spatial parameters to a UE 115. In some cases, transmitting the indication of the set of spatial parameters includes transmitting the indication of the set of spatial parameters via RRC signaling, or DCI, or a combination thereof. In some cases, the set of spatial parameters include an indication of a set of antenna ports, a number of layers, spatial domain precoders, or a combination thereof.

Uplink channel manager 1230 may receive, from the UE 115, the first uplink channel, or the second uplink channel, or a combination thereof, on a set of resources of the component carrier in accordance with each set of spatial parameters. In some cases, the first uplink channel is received from the UE 115 and includes a PUCCH, or a PUSCH, or a combination thereof, and where a simultaneous transmission of the second uplink channel is treated as interference. In some cases, receiving the first uplink channel, or the second uplink channel, or a combination thereof includes receiving the first uplink channel, or the second uplink channel, or a combination thereof at a TRP including a base station 105, an RRH, a cell of the base station 105, a sector of the base station 105, or a combination thereof.

Reference signal alignment manager 1235 may determine an alignment of respective DMRSs for the first uplink channel and the second uplink channel based on the spatial multiplexing configuration, where the first uplink channel and the second uplink channel have different lengths and different starting positions. In some cases, reference signal alignment manager 1235 may transmit an indication of the alignment to a UE 115.

Base station DMRS group manager 1240 may determine multiple sets of DMRS ports based on the spatial multiplexing configuration, where a first set of DMRS ports for the first uplink channel is part of a first DMRS group associated with a first set of antenna ports and a second set of DMRS ports for the second uplink channel is part of a second DMRS group associated with a second set of antenna ports. Base station DMRS group manager 1240 may transmit an indication of the multiple determined sets of DMRS ports to a UE 115. Backhaul transmission component 1245 may transmit, over a backhaul link, an indication of the set of spatial parameters to a different base station, where the first uplink channel is received from a UE 115 and includes a PUCCH, or a PUSCH, or a combination thereof.

Figure 13:
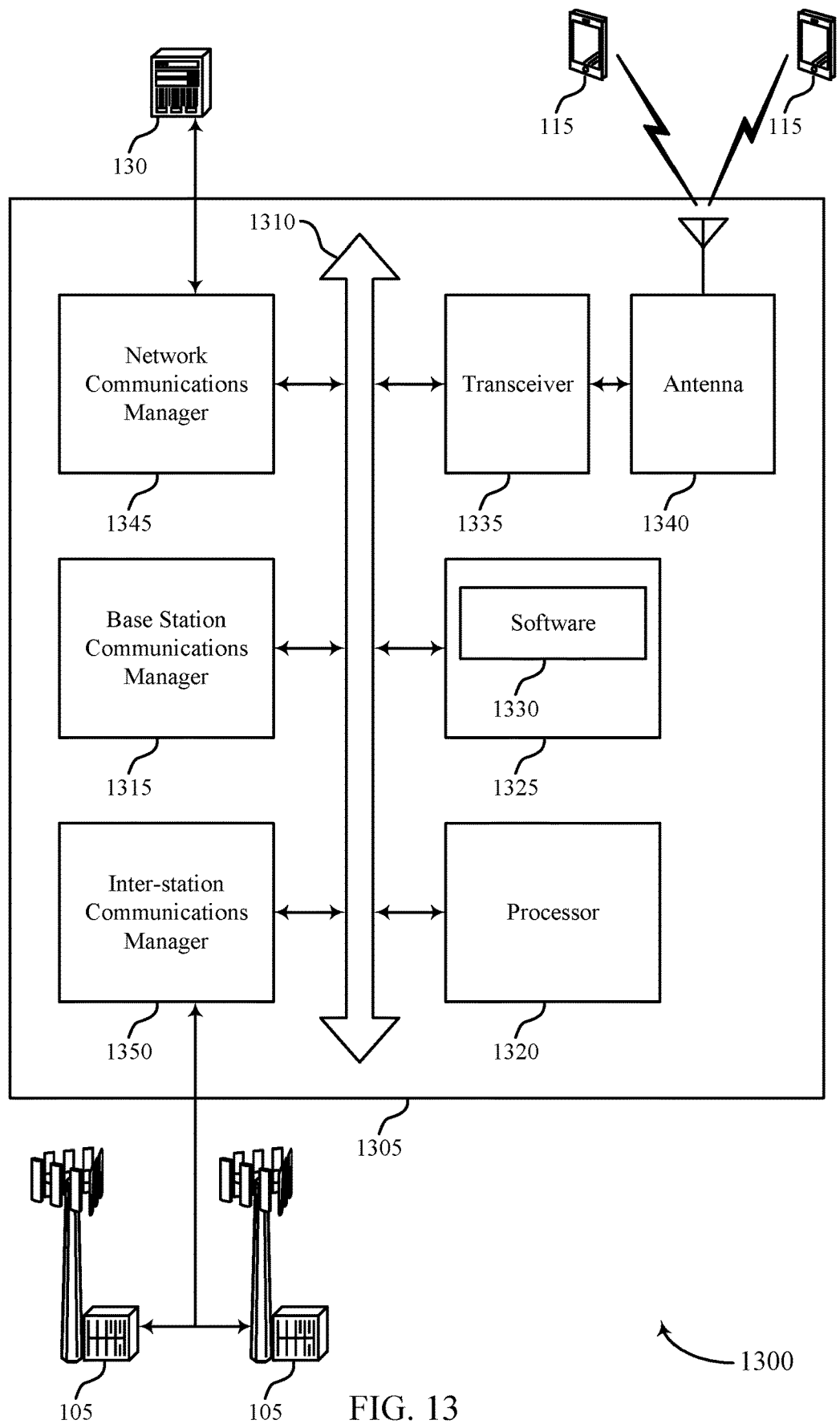
FIG. 13 illustrates a diagram of a system including a base station that supports simultaneous uplink transmissions using spatial multiplexing in accordance with aspects of the present disclosure.

FIG. 13 illustrates a diagram of a system 1300 including a device 1305 that supports simultaneous uplink transmissions using spatial multiplexing in accordance with aspects of the present disclosure. Device 1305 may be an example of or include the components of base station 105 as described herein, e.g., with reference to FIG. 1. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a PLD, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting simultaneous uplink transmissions using spatial multiplexing).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support simultaneous uplink transmissions using spatial multiplexing. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described herein. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas. In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an LTE/LTE-A wireless communication network technology to provide communication between base stations 105.

Figure 14:
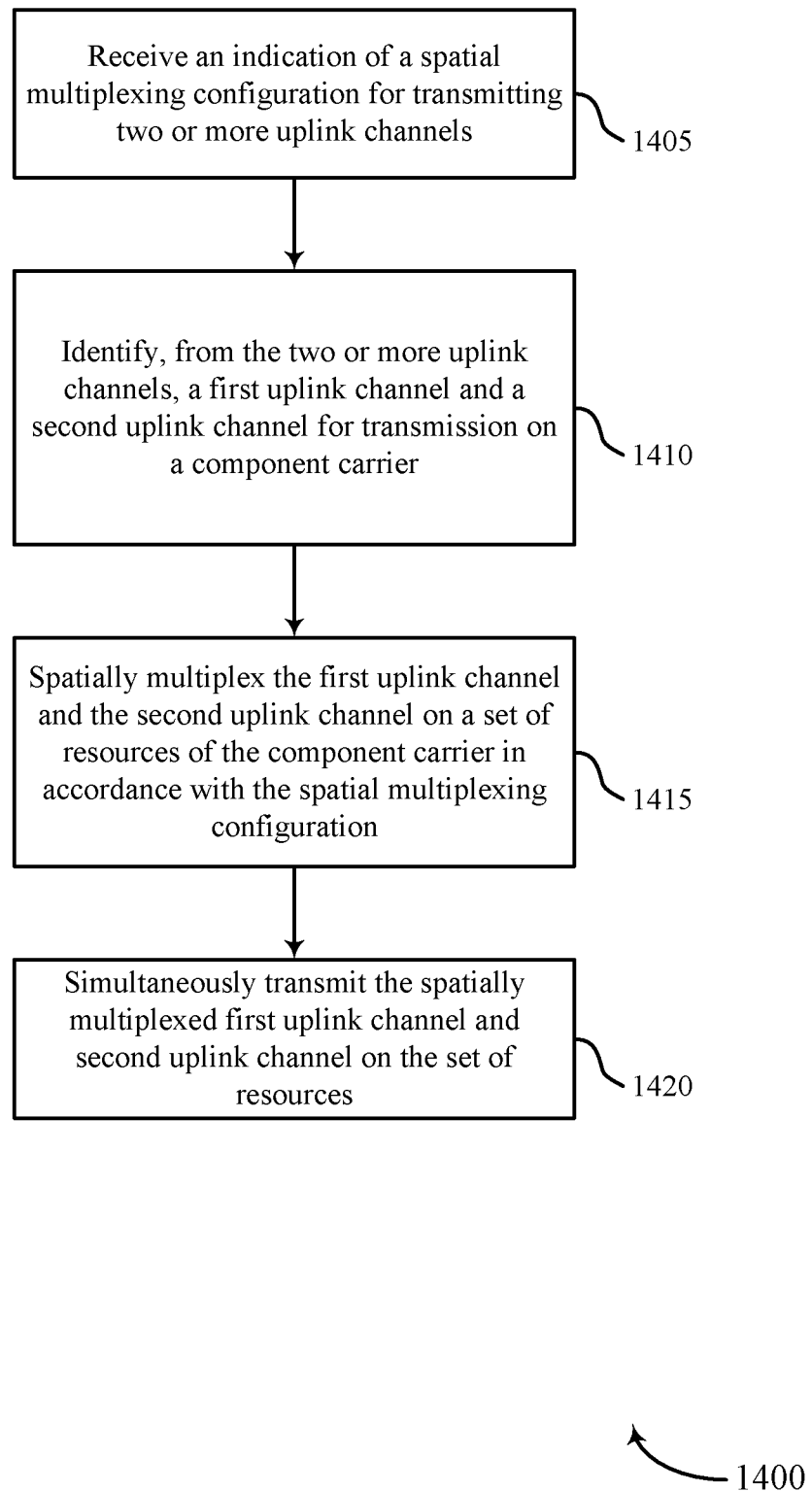
FIGS. 14 through 18 illustrate methods for simultaneous uplink transmissions using spatial multiplexing in accordance with aspects of the present disclosure.

FIG. 14 shows a flowchart illustrating a method 1400 for simultaneous uplink transmissions using spatial multiplexing in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE 115 may execute a set of codes to control the functional elements of the device to perform the functions described herein. Additionally or alternatively, the UE 115 may perform aspects of the functions described herein using special-purpose hardware.

At 1405 the UE 115 may receive an indication of a spatial multiplexing configuration for transmitting two or more uplink channels. The operations of 1405 may be performed according to the methods described herein. In certain examples, aspects of the operations of 1405 may be performed by a UE spatial multiplexing manager as described with reference to FIGS. 6 through 9.

At 1410 the UE 115 may identify, from the two or more uplink channels, a first uplink channel and a second uplink channel for transmission on a component carrier. The operations of 1410 may be performed according to the methods described herein. In certain examples, aspects of the operations of 1410 may be performed by an uplink channel component as described with reference to FIGS. 6 through 9.

At 1415 the UE 115 may spatially multiplex the first uplink channel and the second uplink channel on a set of resources of the component carrier in accordance with the spatial multiplexing configuration. The operations of 1415 may be performed according to the methods described herein. In certain examples, aspects of the operations of 1415 may be performed by a UE spatial multiplexing manager as described with reference to FIGS. 6 through 9.

At 1420 the UE 115 may simultaneously transmit the spatially multiplexed first uplink channel and second uplink channel on the set of resources. The operations of 1420 may be performed according to the methods described herein. In certain examples, aspects of the operations of 1420 may be performed by an uplink channel transmission manager as described with reference to FIGS. 6 through 9.

Figure 15:
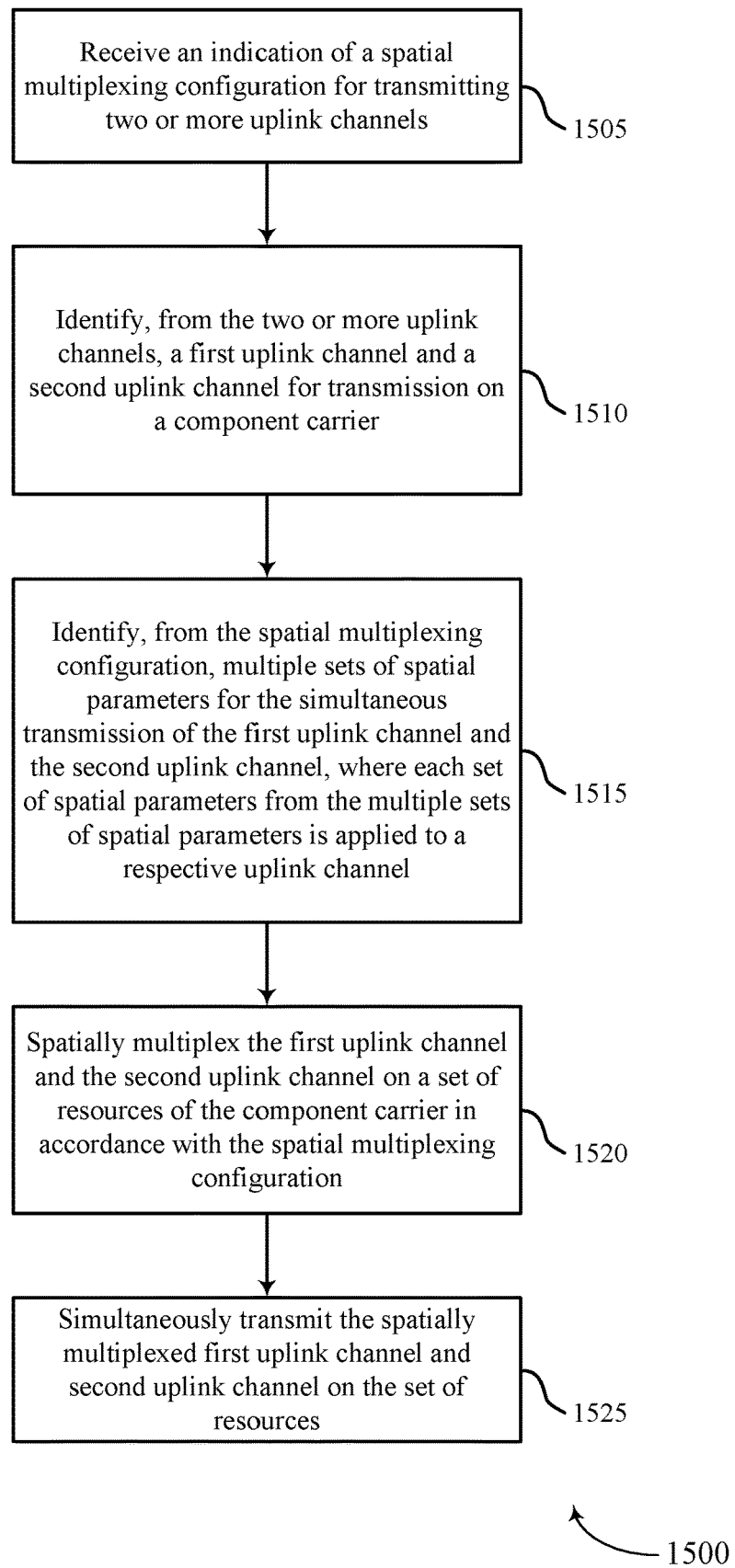

FIG. 15 shows a flowchart illustrating a method 1500 for simultaneous uplink transmissions using spatial multiplexing in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE 115 may execute a set of codes to control the functional elements of the device to perform the functions described herein. Additionally or alternatively, the UE 115 may perform aspects of the functions described herein using special-purpose hardware.

At 1505 the UE 115 may receive an indication of a spatial multiplexing configuration for transmitting two or more uplink channels. The operations of 1505 may be performed according to the methods described herein. In certain examples, aspects of the operations of 1505 may be performed by a UE spatial multiplexing manager as described with reference to FIGS. 6 through 9.

At 1510 the UE 115 may identify, from the two or more uplink channels, a first uplink channel and a second uplink channel for transmission on a component carrier. The operations of 1510 may be performed according to the methods described herein. In certain examples, aspects of the operations of 1510 may be performed by an uplink channel component as described with reference to FIGS. 6 through 9.

At 1515 the UE 115 may identify, from the spatial multiplexing configuration, multiple sets of spatial parameters for the simultaneous transmission of the first uplink channel and the second uplink channel, where each set of spatial parameters from the multiple sets of spatial parameters is applied to a respective uplink channel. The operations of 1515 may be performed according to the methods described herein. In certain examples, aspects of the operations of 1515 may be performed by a spatial parameter manager as described with reference to FIGS. 6 through 9.

At 1520 the UE 115 may spatially multiplex the first uplink channel and the second uplink channel on a set of resources of the component carrier in accordance with the spatial multiplexing configuration. The operations of 1520 may be performed according to the methods described herein. In certain examples, aspects of the operations of 1520 may be performed by a UE spatial multiplexing manager as described with reference to FIGS. 6 through 9.

At 1525 the UE 115 may simultaneously transmit the spatially multiplexed first uplink channel and second uplink channel on the set of resources. The operations of 1525 may be performed according to the methods described herein. In certain examples, aspects of the operations of 1525 may be performed by an uplink channel transmission manager as described with reference to FIGS. 6 through 9.

Figure 16:
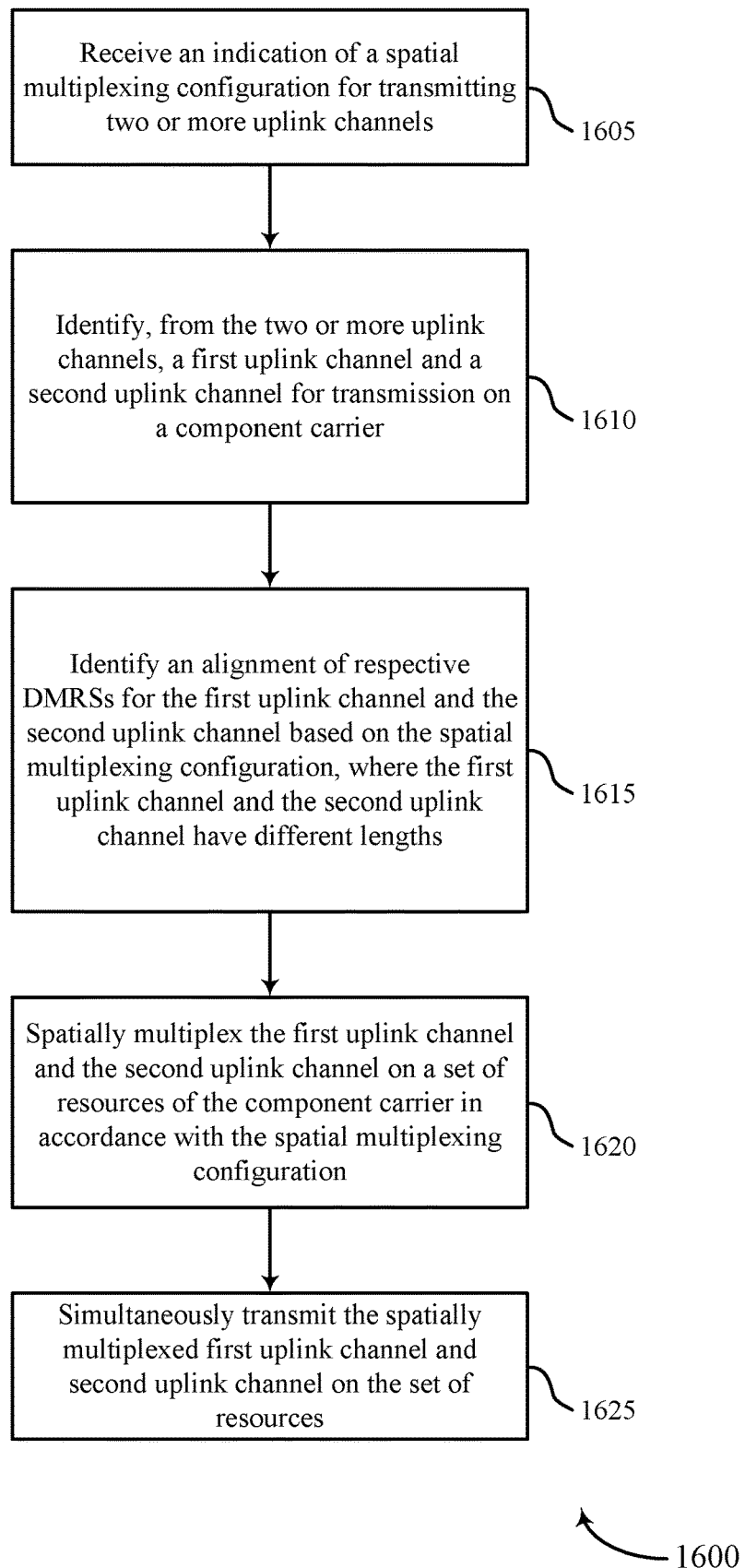

FIG. 16 shows a flowchart illustrating a method 1600 for simultaneous uplink transmissions using spatial multiplexing in accordance with aspects of the present disclosure. The operations of method 1600 may be implemented by a UE 115 or its components as described herein. For example, the operations of method 1600 may be performed by a UE communications manager as described with reference to FIGS. 6 through 9. In some examples, a UE 115 may execute a set of codes to control the functional elements of the device to perform the functions described herein. Additionally or alternatively, the UE 115 may perform aspects of the functions described herein using special-purpose hardware.

At 1605 the UE 115 may receive an indication of a spatial multiplexing configuration for transmitting two or more uplink channels. The operations of 1605 may be performed according to the methods described herein. In certain examples, aspects of the operations of 1605 may be performed by a UE spatial multiplexing manager as described with reference to FIGS. 6 through 9.

At 1610 the UE 115 may identify, from the two or more uplink channels, a first uplink channel and a second uplink channel for transmission on a component carrier. In some examples, the first uplink channel and the second uplink channel may be different types. The operations of 1610 may be performed according to the methods described herein. In certain examples, aspects of the operations of 1610 may be performed by an uplink channel component as described with reference to FIGS. 6 through 9.

At 1615 the UE 115 may identify an alignment of respective DMRSs for the first uplink channel and the second uplink channel based on the spatial multiplexing configuration, where the first uplink channel and the second uplink channel have different lengths and different starting positions. The operations of 1615 may be performed according to the methods described herein. In certain examples, aspects of the operations of 1615 may be performed by a reference signal alignment component as described with reference to FIGS. 6 through 9.

At 1620 the UE 115 may spatially multiplex the first uplink channel and the second uplink channel on a set of resources of the component carrier in accordance with the spatial multiplexing configuration. The operations of 1620 may be performed according to the methods described herein. In certain examples, aspects of the operations of 1620 may be performed by a UE spatial multiplexing manager as described with reference to FIGS. 6 through 9.

At 1625 the UE 115 may simultaneously transmit the spatially multiplexed first uplink channel and second uplink channel on the set of resources. The operations of 1625 may be performed according to the methods described herein. In certain examples, aspects of the operations of 1625 may be performed by an uplink channel transmission manager as described with reference to FIGS. 6 through 9.

Figure 17:
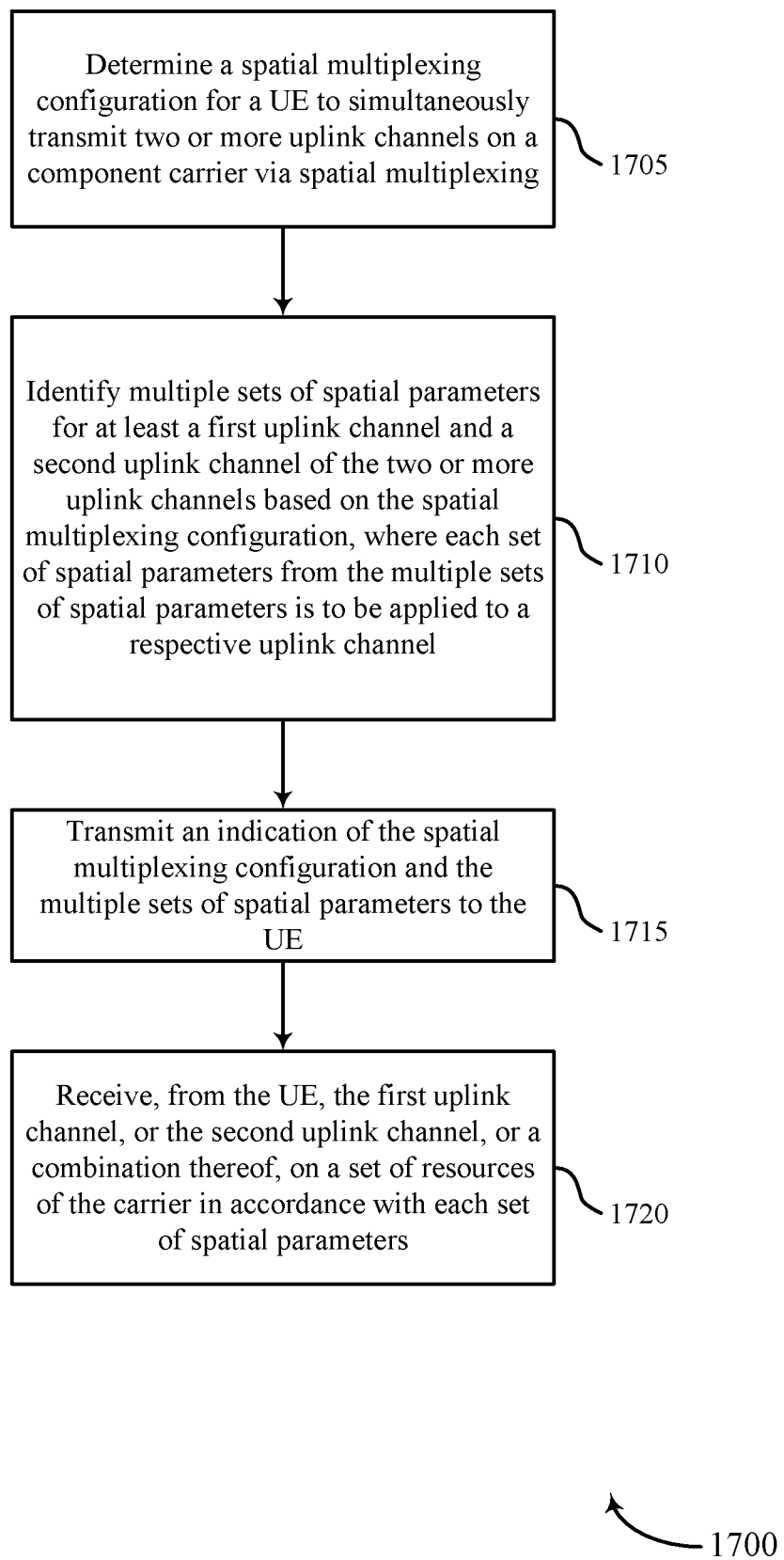

FIG. 17 shows a flowchart illustrating a method 1700 for simultaneous uplink transmissions using spatial multiplexing in accordance with aspects of the present disclosure. The operations of method 1700 may be implemented by a TRP, such as a base station 105 or its components as described herein. For example, the operations of method 1700 may be performed by a base station communications manager as described with reference to FIGS. 10 through 13. In some examples, a base station 105 may execute a set of codes to control the functional elements of the device to perform the functions described herein. Additionally or alternatively, the base station 105 may perform aspects of the functions described herein using special-purpose hardware.

At 1705 the TRP may determine a spatial multiplexing configuration for a UE 115 to simultaneously transmit two or more uplink channels on a component carrier via spatial multiplexing. The operations of 1705 may be performed according to the methods described herein. In certain examples, aspects of the operations of 1705 may be performed by a spatial multiplexing configuration component as described with reference to FIGS. 10 through 13.

At 1710 the TRP may identify multiple sets of spatial parameters for at least a first uplink channel and a second uplink channel of the two or more uplink channels based on the spatial multiplexing configuration, where each set of spatial parameters from the multiple sets of spatial parameters is to be applied to a respective uplink channel. The operations of 1710 may be performed according to the methods described herein. In certain examples, aspects of the operations of 1710 may be performed by a spatial parameter component as described with reference to FIGS. 10 through 13.

At 1715 the TRP may transmit an indication of the spatial multiplexing configuration and the multiple sets of spatial parameters to the UE 115. The operations of 1715 may be performed according to the methods described herein. In certain examples, aspects of the operations of 1715 may be performed by a spatial parameter component as described with reference to FIGS. 10 through 13.

At 1720 the TRP may receive, from the UE 115, the first uplink channel, or the second uplink channel, or a combination thereof, on a set of resources of the component carrier in accordance with each set of spatial parameters. The operations of 1720 may be performed according to the methods described herein. In certain examples, aspects of the operations of 1720 may be performed by an uplink channel manager as described with reference to FIGS. 10 through 13.

Figure 18:
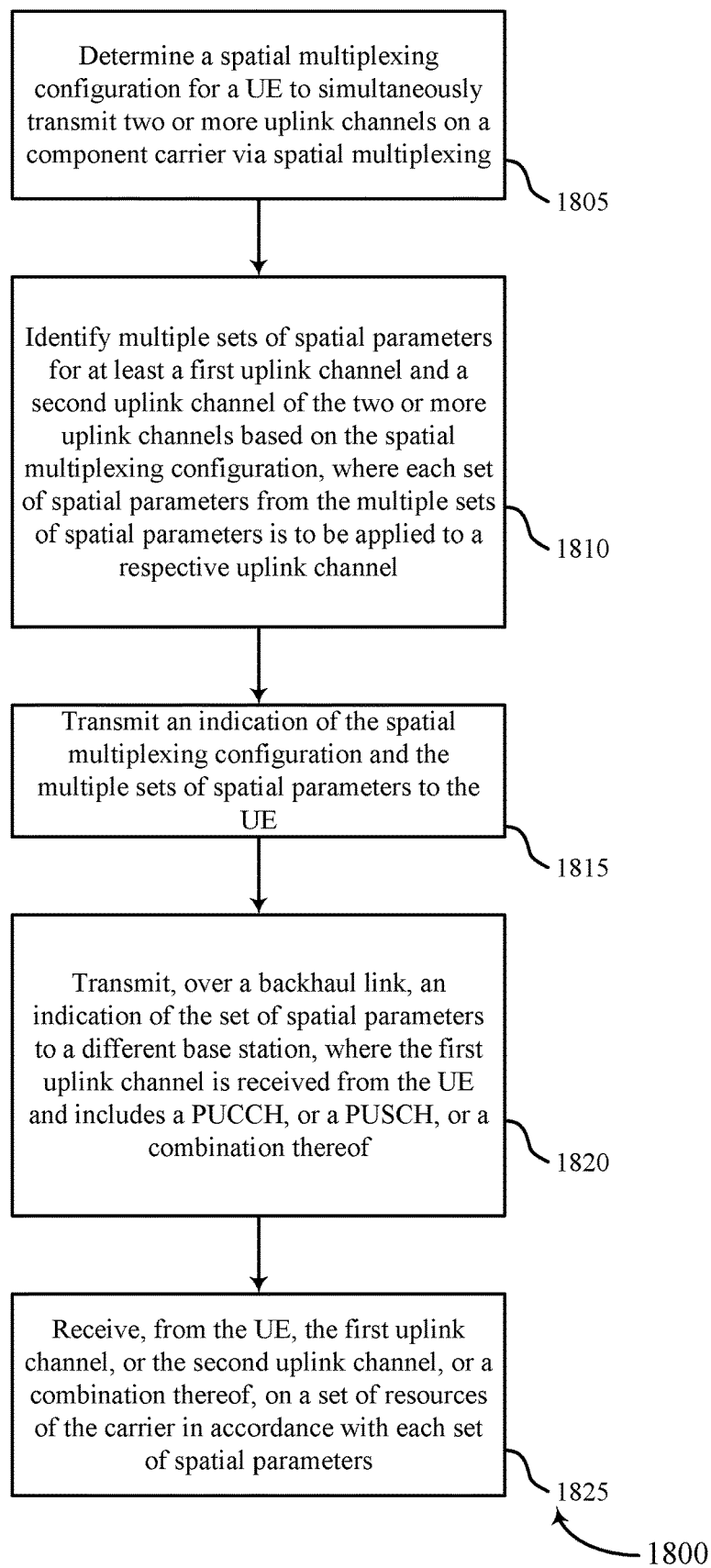

FIG. 18 shows a flowchart illustrating a method 1800 for simultaneous uplink transmissions using spatial multiplexing in accordance with aspects of the present disclosure. The operations of method 1800 may be implemented by a TRP, such as a base station 105 or its components as described herein. For example, the operations of method 1800 may be performed by a base station communications manager as described with reference to FIGS. 10 through 13. In some examples, a base station 105 may execute a set of codes to control the functional elements of the device to perform the functions described herein. Additionally or alternatively, the base station 105 may perform aspects of the functions described herein using special-purpose hardware.

At 1805 the TRP may determine a spatial multiplexing configuration for a UE 115 to simultaneously transmit two or more uplink channels on a component carrier via spatial multiplexing. The operations of 1805 may be performed according to the methods described herein. In certain examples, aspects of the operations of 1805 may be performed by a spatial multiplexing configuration component as described with reference to FIGS. 10 through 13.

At 1810 the TRP may identify multiple sets of spatial parameters for at least a first uplink channel and a second uplink channel of the two or more uplink channels based on the spatial multiplexing configuration, where each set of spatial parameters from the multiple sets of spatial parameters is to be applied to a respective uplink channel. The operations of 1810 may be performed according to the methods described herein. In certain examples, aspects of the operations of 1810 may be performed by a spatial parameter component as described with reference to FIGS. 10 through 13.

At 1815 the TRP may transmit an indication of the spatial multiplexing configuration and the multiple sets of spatial parameters to the UE 115. The operations of 1815 may be performed according to the methods described herein. In certain examples, aspects of the operations of 1815 may be performed by a spatial parameter component as described with reference to FIGS. 10 through 13.

At 1820 the TRP may transmit, over a backhaul link, an indication of the set of spatial parameters to a different base station, where the first uplink channel is received from the UE and includes a PUCCH, or a PUSCH, or a combination thereof. The operations of 1820 may be performed according to the methods described herein. In certain examples, aspects of the operations of 1820 may be performed by a backhaul transmission component as described with reference to FIGS. 10 through 13.

At 1825 the TRP may receive, from the UE 115, the first uplink channel, or the second uplink channel, or a combination thereof, on a set of resources of the component carrier in accordance with each set of spatial parameters. The operations of 1825 may be performed according to the methods described herein. In certain examples, aspects of the operations of 1825 may be performed by an uplink channel manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of UMTS. LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a base station, an indication of a spatial multiplexing configuration, comprising multiple sets of spatial parameters, each set of spatial parameters corresponding to a respective uplink channel and comprising at least one of an indication of a set of antenna ports, a quantity of spatial layers, spatial domain precoders, or a combination thereof, for transmitting two or more uplink channels;
   identifying, from the two or more uplink channels, a first uplink channel and a second uplink channel for transmission on a component carrier;
   identifying, from the spatial multiplexing configuration, the multiple sets of spatial parameters for the transmission of the first uplink channel and the second uplink channel, wherein each set of spatial parameters from the multiple sets of spatial parameters is applied to a respective uplink channel;
   spatially multiplexing the first uplink channel and the second uplink channel on a set of resources of the component carrier in accordance with the spatial multiplexing configuration; and
   transmitting the spatially multiplexed first uplink channel and second uplink channel on the set of resources.

2. The method of claim 1, wherein transmitting the spatially multiplexed first uplink channel and second uplink channel comprises:
   simultaneously-transmitting the spatially multiplexed first uplink channel and second uplink channel using different transmit antennas or different antenna ports.

3. The method of claim 1, wherein the two or more uplink channels comprise at least two channels from a group consisting of: a physical uplink control channel (PUCCH), a physical uplink shared channel (PUSCH), a physical random access channel (PRACH), and a sounding reference signal (SRS).

4. The method of claim 3, wherein the first uplink channel comprises a PUCCH and the second uplink channel comprises a PUSCH.

5. The method of claim 1, wherein the first uplink channel and the second uplink channel comprise different types of channels.

6. The method of claim 1, further comprising:
   receiving an indication of the multiple sets of spatial parameters via radio resource control (RRC) signaling, or downlink control information (DCI), or a combination thereof.

7. The method of claim 1, further comprising:
   identifying an alignment of respective demodulation reference signals (DMRSs) for the first uplink channel and the second uplink channel based at least in part on the spatial multiplexing configuration, wherein the first uplink channel and the second uplink channel have different lengths and different starting positions; and
   transmitting, with the spatially multiplexed first uplink channel and second uplink channel on the set of resources, a first DMRS for the first uplink channel and a second DMRS for the second uplink channel, wherein the first DMRS and the second DMRS are transmitted within a same orthogonal frequency-division multiplexing (OFDM) symbol period in accordance with the identified alignment.

8. The method of claim 7, further comprising:
   identifying multiple sets of DMRS ports based at least in part on the spatial multiplexing configuration, wherein a first set of DMRS ports is part of a first DMRS group associated with a first set of antenna ports and a second set of DMRS ports is part of a second DMRS group associated with a second set of antenna ports.

9. The method of claim 7, wherein the first DMRS is time-division multiplexed with a first set of data in the first uplink channel and the second DMRS is time-division multiplexed with a second set of data in the second uplink channel.

10. The method of claim 1, wherein the first uplink channel comprises a sounding reference signal (SRS) and the second uplink channel comprises a physical uplink control channel (PUCCH), or a physical uplink shared channel (PUSCH), or a combination thereof.

11. The method of claim 10, further comprising:
transmitting, with the spatially multiplexed first uplink channel and second uplink channel on the set of resources, the SRS and data within a same orthogonal frequency-division multiplexing (OFDM) symbol period on the first uplink channel.

12. The method of claim 10, further comprising:
transmitting, with the spatially multiplexed first uplink channel and second uplink channel on the set of resources, the SRS and a demodulation reference signal (DMRS) within a same orthogonal frequency-division multiplexing (OFDM) symbol period on the first uplink channel, the DMRS being associated with the PUCCH, or the PUSCH, or a combination thereof, wherein the SRS and the DMRS are frequency division multiplexed.

13. The method of claim 1, wherein transmitting the spatially multiplexed first uplink channel and second uplink channel comprises:
transmitting the first uplink channel to a first transmission/reception point (TRP); and
transmitting the second uplink channel to a different TRP.

14. The method of claim 13, wherein the first uplink channel comprises a first physical uplink control channel (PUCCH) and the second uplink channel comprises a second PUCCH different from the first PUCCH.

15. The method of claim 14, wherein the first PUCCH comprises first hybrid automatic repeat request (HARQ) feedback transmitted to the first TRP and the second PUCCH comprises second HARQ feedback transmitted to the different TRP.

16. The method of claim 13, wherein the second uplink channel comprises a physical random access channel (PRACH) and the first uplink channel comprises a physical uplink control channel (PUCCH), or a physical uplink shared channel (PUSCH), or a sounding reference signal (SRS), or a combination thereof.

17. The method of claim 1, wherein the first uplink channel is quasi co-located with a first set of downlink reference signals and the second uplink channel is quasi co-located with a second set of downlink reference signals different from the first set of downlink reference signals.

18. The method of claim 1, wherein the spatially multiplexed first uplink channel and second uplink channel are quasi co-located with a same set of downlink reference signals.

19. The method of claim 1, wherein the first uplink channel is transmitted in accordance with a first service and the second uplink channel is transmitted in accordance with a second service different from the first service.

20. The method of claim 1, wherein the first uplink channel is a dynamically scheduled uplink transmission and the second uplink channel is an uplink transmission configured via radio resource control (RRC) messaging.

21. The method of claim 1, further comprising:
determining a power control configuration for transmitting the spatially multiplexed first uplink channel and second uplink channel based at least in part on the spatial multiplexing configuration, wherein the power control configuration comprises a first transmit power for the first uplink channel and a second transmit power for the second uplink channel.

22. The method of claim 21, further comprising:
determining that the first uplink channel comprises a sounding reference signal (SRS) and the second uplink channel comprises a physical uplink control channel (PUCCH), or a physical uplink shared channel (PUSCH), or a combination thereof; and
de-boosting the first transmit power based at least in part on the determination that the first uplink channel comprises the SRS.

23. A method for wireless communication at a base station, comprising:
determining a spatial multiplexing configuration for a user equipment (UE) to transmit two or more uplink channels on a component carrier via spatial multiplexing;
identifying, from the spatial multiplexing configuration, multiple sets of spatial parameters, each set of spatial parameters corresponding to a respective uplink channel and comprising at least one of an indication of a set of antenna ports, a quantity of spatial layers, spatial domain precoders, or a combination thereof, for at least a first uplink channel and a second uplink channel of the two or more uplink channels, wherein each set of spatial parameters from the multiple sets of spatial parameters is to be applied to a respective uplink channel;
transmitting an indication of the spatial multiplexing configuration and the multiple sets of spatial parameters to the UE; and
receiving, from the UE, the first uplink channel, or the second uplink channel, or a combination thereof, on a set of resources of the component carrier in accordance with each set of spatial parameters.

24. The method of claim 23, wherein the two or more uplink channels comprise at least two channels from a group consisting of: a physical uplink control channel (PUCCH), a physical uplink shared channel (PUSCH), a physical random access channel (PRACH), and a sounding reference signal (SRS).

25. The method of claim 23, further comprising:
transmitting, over a backhaul link, an indication of the multiple sets of spatial parameters to a second base station, wherein the first uplink channel is received from the UE and comprises a physical uplink control channel (PUCCH), or a physical uplink shared channel (PUSCH), or a combination thereof.

26. The method of claim 23, wherein transmitting the indication of the multiple sets of spatial parameters comprises:
transmitting the indication of the set of spatial parameters via radio resource (RRC) signaling, or downlink control information (DCI), or a combination thereof.

27. An apparatus for wireless communication, comprising: a processor; memory coupled with the processor; and instructions stored in the memory and executable by the processor to cause the apparatus to:
receive, from a base station, an indication of a spatial multiplexing configuration, comprising multiple sets of spatial parameters, each set of spatial parameters corresponding to a respective uplink channel and comprising at least one of an indication of a set of antenna ports, a quantity of spatial layers, spatial domain precoders, or a combination thereof for transmitting two or more uplink channels;

identify, from the two or more uplink channels, a first uplink channel and a second uplink channel for transmission on a component carrier;
identify, from the spatial multiplexing configuration, the multiple sets of spatial parameters for the transmission of the first uplink channel and the second uplink channel, wherein each set of spatial parameters from the multiple sets of spatial parameters is applied to a respective uplink channel;
spatially multiplex the first uplink channel and the second uplink channel on a set of resources of the component carrier in accordance with the spatial multiplexing configuration; and
transmit the spatially multiplexed first uplink channel and second uplink channel on the set of resources.

28. An apparatus for wireless communication, comprising: a processor; memory coupled with the processor; and instructions stored in the memory and executable by the processor to cause the apparatus to:
determine a spatial multiplexing configuration for a user equipment (UE) to transmit two or more uplink channels on a component carrier via spatial multiplexing;
identify, from the spatial multiplexing configuration, multiple sets of spatial parameters, each set of spatial parameters corresponding to a respective uplink channel and comprising at least one of an indication of a set of antenna ports, a quantity of spatial layers, spatial domain precoders, or a combination thereof, for at least a first uplink channel and a second uplink channel of the two or more uplink channels, wherein each set of spatial parameters from the multiple sets of spatial parameters is to be applied to a respective uplink channel;
transmit, from a base station, an indication of the spatial multiplexing configuration and the multiple sets of spatial parameters to the UE; and
receive, from the UE, the first uplink channel, or the second uplink channel, or a combination thereof, on a set of resources of the component carrier in accordance with each set of spatial parameters.

* * * * *